US012178386B2

(12) United States Patent
Kim

(10) Patent No.: US 12,178,386 B2
(45) Date of Patent: Dec. 31, 2024

(54) ROBOT CLEANER AND CONTROL METHOD THEREOF

(71) Applicant: SAMSUNG ELECTRONICS CO., LTD., Suwon-si (KR)

(72) Inventor: Yijun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 377 days.

(21) Appl. No.: 17/847,995

(22) Filed: Jun. 23, 2022

(65) Prior Publication Data

US 2022/0378269 A1 Dec. 1, 2022

Related U.S. Application Data

(63) Continuation of application No. PCT/KR2022/007127, filed on May 18, 2022.

(30) Foreign Application Priority Data

May 26, 2021 (KR) .................. 10-2021-0067452

(51) Int. Cl.
*H04W 4/33* (2018.01)
*A47L 9/28* (2006.01)
(Continued)

(52) U.S. Cl.
CPC .......... *A47L 9/2894* (2013.01); *G05D 1/0044* (2013.01); *H04W 24/02* (2013.01);
(Continued)

(58) Field of Classification Search
CPC ................................ H04W 16/20; H04W 4/33
See application file for complete search history.

(56) References Cited

U.S. PATENT DOCUMENTS 9,055,451 B2 6/2015 Kim et al.
9,432,964 B2 8/2016 Garin et al.
(Continued)

FOREIGN PATENT DOCUMENTS

JP 2014-190721 A 10/2014
KR 10-0994840 B1 11/2010
(Continued)

OTHER PUBLICATIONS

Communication dated Mar. 11, 2024, issued by the European Patent Office in European Application No. 22811561.4.
(Continued)

*Primary Examiner* — Kevin Kim
(74) *Attorney, Agent, or Firm* — Sughrue Mion, PLLC

(57) ABSTRACT

A robot cleaner includes: a communication interface configured to operate in an AP mode in which the communication interface outputs a wireless signal corresponding to a wireless signal output value of an AP device; and a processor configured to: control to sequentially move the robot cleaner to measurement locations, output the wireless signal output through the AP mode of communication interface and, with respect to the wireless signal, obtain signal strength information related to a connection strength between the robot cleaner and electronic devices disposed in the space, respectively, at the measurement locations; and based on the signal strength information, identify a measurement location at which a signal strength of the electronic devices is a threshold value or more, as a recommended AP location of the AP device, among the measurement locations.

20 Claims, 18 Drawing Sheets

(51) Int. Cl.
  *G05D 1/00* (2006.01)
  *H04W 24/02* (2009.01)
  *H04W 64/00* (2009.01)

(52) U.S. Cl.
  CPC ....... *H04W 64/003* (2013.01); *A47L 2201/04* (2013.01); *H04W 4/33* (2018.02)

(56) References Cited

U.S. PATENT DOCUMENTS

| | | |
|---|---|---|
| 9,888,360 B2 | 2/2018 | Sharma et al. |
| 10,939,303 B2 | 3/2021 | Bai |
| 11,330,951 B2 | 5/2022 | Kim et al. |
| 11,592,573 B2 | 2/2023 | Kearns et al. |
| 2013/0003572 A1 | 1/2013 | Kim et al. |
| 2015/0312774 A1 | 10/2015 | Lau |
| 2017/0131721 A1 | 5/2017 | Kwak et al. |
| 2018/0249341 A1 | 8/2018 | Park et al. |
| 2018/0299899 A1 | 10/2018 | Suvarna et al. |
| 2020/0237176 A1 | 7/2020 | Bassa et al. |
| 2021/0121035 A1 | 4/2021 | Kim et al. |
| 2022/0066456 A1* | 3/2022 | Ebrahimi Afrouzi ........................ G06F 3/04883 |
| 2022/0095872 A1* | 3/2022 | Bassa ..................... G05D 1/223 |

FOREIGN PATENT DOCUMENTS

| | | | |
|---|---|---|---|
| KR | 10-1031205 | B1 | 4/2011 |
| KR | 101164213 | B1 | 7/2012 |
| KR | 10-2013-0029852 | A | 3/2013 |
| KR | 10-1471038 | B1 | 12/2014 |
| KR | 10-1536253 | B1 | 7/2015 |
| KR | 1020170053351 | A | 5/2017 |
| KR | 1020180098077 | A | 9/2018 |
| KR | 1020200034498 | A | 3/2020 |
| KR | 10-2149279 | B1 | 8/2020 |
| KR | 10-2021-0051014 | A | 5/2021 |
| KR | 20220169847 | A * | 12/2022 |
| WO | 2007/056738 | A2 | 5/2007 |

OTHER PUBLICATIONS

International Search Report (PCT/ISA/210) issued Aug. 18, 2022 by the International Search Authority in International Application No. PCT/KR2022/007127.

Written Opinion (PCT/ISA/237) issued Aug. 18, 2022 by the International Search Authority in International Application No. PCT/KR2022/007127.

\* cited by examiner

| TV ✓ | REFRIGERATOR ✓ | OVEN ✓ |
|---|---|---|
| RSSI: -60dBm<br>Speed: 18Mbps | RSSI: -58dBm<br>Speed: 23Mbps | RSSI: -57dBm<br>Speed: 26Mbps |
| REQUIRED SPECIFICATION<br>RSSI: -50dBm<br>Speed: 20Mbps | REQUIRED SPECIFICATION<br>RSSI: -60dBm<br>Speed: 10Mbps | REQUIRED SPECIFICATION<br>RSSI: -70dBm<br>Speed: 5Mbps |
| WASHER ✓ | DRYER ✓ | AIR CONDITIONER ✓ |
| RSSI: -65dBm<br>Speed: 12Mbps | RSSI: -62dBm<br>Speed: 16Mbps | RSSI: -50dBm<br>Speed: 28Mbps |
| REQUIRED SPECIFICATION<br>RSSI: -70dBm<br>Speed: 5Mbps | REQUIRED SPECIFICATION<br>RSSI: -70dBm<br>Speed: 5Mbps | REQUIRED SPECIFICATION<br>RSSI: -70dBm<br>Speed: 5Mbps |

920

| TV ✗ | REFRIGERATOR ✓ | OVEN ✓ |
|---|---|---|
| RSSI: -70dBm<br>Speed: 5Mbps | RSSI: -40dBm<br>Speed: 33Mbps | RSSI: -38dBm<br>Speed: 36Mbps |
| REQUIRED SPECIFICATION<br>RSSI: -50dBm<br>Speed: 20Mbps | REQUIRED SPECIFICATION<br>RSSI: -60dBm<br>Speed: 10Mbps | REQUIRED SPECIFICATION<br>RSSI: -70dBm<br>Speed: 5Mbps |
| WASHER ✓ | DRYER ✓ | AIR CONDITIONER ✓ |
| RSSI: -62dBm<br>Speed: 16Mbps | RSSI: -60dBm<br>Speed: 8Mbps | RSSI: -65dBm<br>Speed: 12Mbps |
| REQUIRED SPECIFICATION<br>RSSI: -70dBm<br>Speed: 5Mbps | REQUIRED SPECIFICATION<br>RSSI: -70dBm<br>Speed: 5Mbps | REQUIRED SPECIFICATION<br>RSSI: -70dBm<br>Speed: 5Mbps |

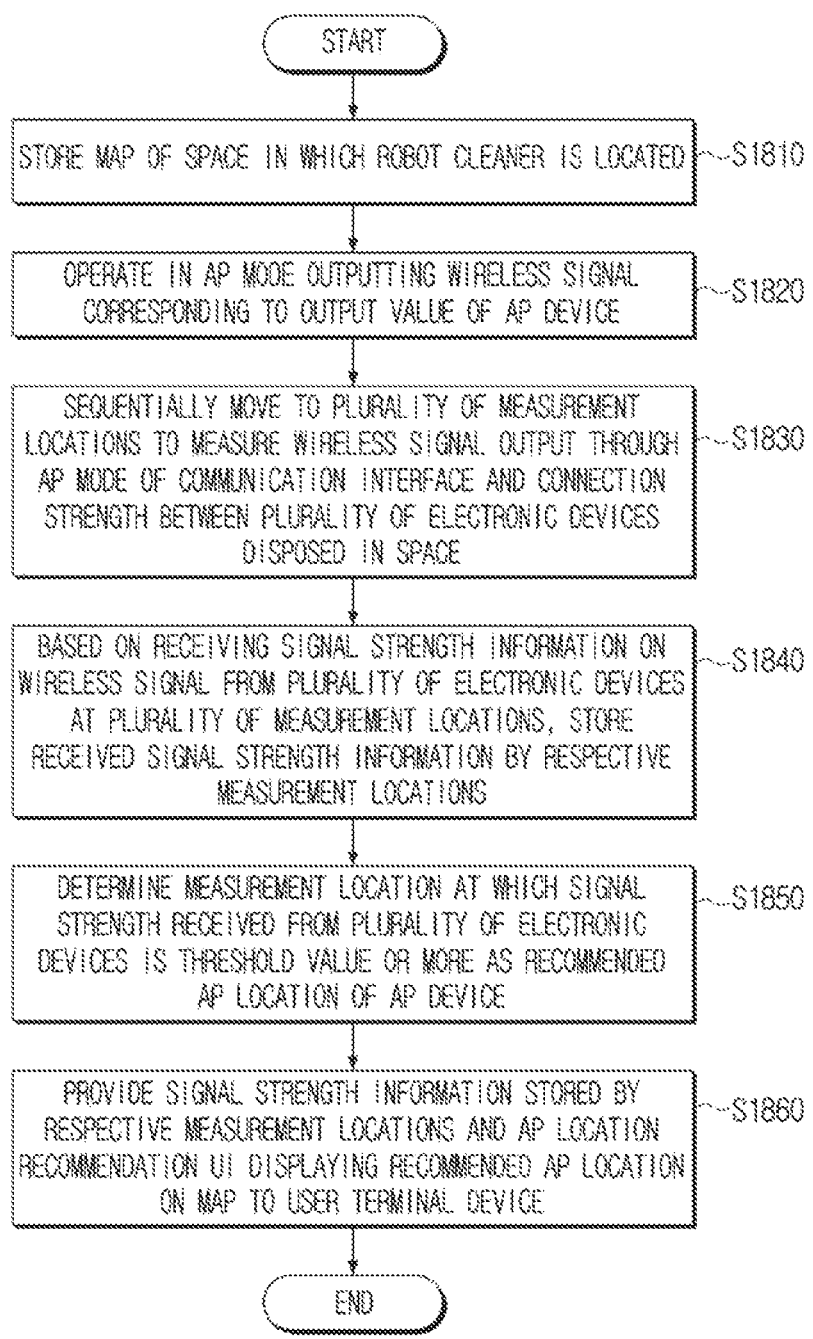

ROBOT CLEANER AND CONTROL METHOD THEREOF

CROSS-REFERENCE TO RELATED APPLICATION

This application is a bypass continuation of International Application No. PCT/KR2022/007127, filed on May 18, 2022, which is based on and claims priority to Korean Patent Application No. 10-2021-0067452, filed on May 26, 2021, in the Korean Intellectual Property Office, the disclosures of which are incorporated by reference herein in their entireties.

BACKGROUND

1. Field

The disclosure relates to a robot cleaner and a control method thereof. More particularly, the disclosure relates to a robot cleaner which provides a function of recommending an optimal location for access point (AP) installation in a space by measuring a wireless connection strength with various electronic devices while a robot cleaner capable of providing a wireless network through a Software enabled AP (Soft AP) moves in a space in a home and a control method thereof.

2. Description of Related Art

Recently, Internet of Things (IoT) is widely being used. For example, a plurality of home appliances may be connected to one AP device in the home, and information on a plurality of home appliances may be displayed or an operation may be controlled through a mobile device.

To use the IoT service, all electronic devices in the home need to be connected to an Internet. For example, the plurality of electronic devices may wirelessly communicate by being connected to the AP device such as a router which provides a wireless network.

However, when some electronic devices are located at a shadow area outside of a wireless signal coverage range of the AP device according to an installation location in the home of the AP device, communication between the devices may be limited.

Accordingly, although there has been a need to find the locations of AP devices capable of covering all electronic devices in the home, there has been a problem of inconvenience to a user moving the location of the AP device and finding the location at which wireless communication runs smoothly with all electronic devices.

SUMMARY

Aspects of the disclosure are to address at least the above-mentioned problems and/or disadvantages and to provide at least the advantages described below.

Embodiments provide a robot cleaner which includes a function of recommending an optimal AP installation location configured such that a robot cleaner capable of moving in a space by traveling on its own and providing a wireless signal through a Soft AP mode to measure the wireless connection strength with the various electronic devices from a plurality of locations and cover all electronic devices, and a control method thereof.

Additional aspects will be set forth in part in the description which follows and, in part, will be apparent from the description, or may be learned by practice of the presented embodiments.

According to an aspect of the disclosure, there is provided a robot cleaner including: a driving device; a communication interface configured to operate in an access point (AP) mode in which the communication interface outputs a wireless signal corresponding to a wireless signal output value of an AP device; a memory configured to store a map of a space in which the robot cleaner travels; and a processor configured to: control the driving device to sequentially move the robot cleaner to a plurality of measurement locations, control the robot cleaner to output the wireless signal output through the AP mode of the communication interface and, with respect to the wireless signal, obtain signal strength information related to a connection strength between the robot cleaner and a plurality of electronic devices disposed in the space, respectively, at the plurality of measurement locations; store the signal strength information in the memory in correspondence to the plurality of measurement locations; and based on the stored signal strength information, identify a measurement location at which a signal strength of the plurality of electronic devices is a threshold value or more, as a recommended AP location of the AP device, among the plurality of measurement locations, wherein the communication interface is further configured to communicate with a user terminal device, and wherein the processor is further configured to control the communication interface to provide, to the user terminal device, the signal strength information that was stored in correspondence to the plurality of measurement locations and an AP location recommendation user interface (UI) configured to display, on the user terminal device, the recommended AP location on the map.

The processor is further configured to control to display, on the user terminal device, the signal strength information by locations corresponding to the plurality of measurement locations on the map in the AP location recommendation UI.

The processor is further configured to: identify names of the plurality of electronic devices based on corresponding hostnames obtained when wirelessly connecting with the plurality of electronic devices through the AP mode, and control to display, on the user terminal device, the identified names of the plurality of electronic devices and the signal strength information corresponding thereto in the AP location recommendation UI.

The processor is further configured to receive an input of an AP location recommendation condition from the user terminal device through the communication interface, and identify the recommended AP location based on the signal strength information and further based on the AP location recommendation condition, and wherein the AP location recommendation condition includes at least one from among a type of AP device to be used, whether there is a difference in connection quality for the plurality of electronic devices, and whether a location of an outlet is to be considered.

The AP location recommendation condition includes the type of AP device that is a preinstalled AP device or a relay AP device for extending wireless coverage of the preinstalled AP device, wherein the processor is further configured to, based on the type of AP device to be used being input as the relay AP device, identify a recommended AP location from among the plurality of measurement locations at which a connection signal strength between the robot cleaner and the preinstalled AP device is a preset value or more, and wherein the AP device is the preinstalled AP device.

The robot cleaner further includes a camera, and the processor is further configured to, based on the AP location recommendation condition being the location of the outlet, check a location of an outlet in the space based on an image captured through the camera, and store the location of the outlet on the map.

The processor is further configured to identify the recommended AP location from among the plurality of measurement locations within a preset distance with respect to the location of the outlet stored on the map.

The processor is further configured to: control the driving device to move in a direction in which a connection signal strength with the AP device increases based on an AP location recommendation instruction being input, based on the robot cleaner reaching a preset distance or less with respect to the AP device, start operating the communication interface in the AP mode, and control the communication interface to receive first signal strength information with respect to the plurality of electronic devices, respectively, based on the wireless signal output through the AP mode of the communication interface and receive second signal strength information with respect to the plurality of electronic devices, respectively, based on a wireless signal output through the AP device, and adjust an AP mode output value of the communication interface to have a value corresponding to the wireless signal output value of the AP device based on the first signal strength information and the second signal strength information.

According to an aspect of the disclosure, there is provided a control method of a robot cleaner, the control method including: storing a map of a space in which the robot cleaner travels; operating in an access point (AP) mode of the robot cleaner in which the robot cleaner outputs a wireless signal corresponding to a wireless signal output value of an AP device; sequentially moving the robot cleaner to a plurality of measurement locations to output the wireless signal through the AP mode and, with respect to the wireless signal, obtain signal strength information related to a connection strength between the robot cleaner and a plurality of electronic devices disposed in the space, respectively, at the plurality of measurement locations; storing the signal strength information in correspondence to the plurality of measurement locations; based on the stored signal strength information, identifying a measurement location at which a signal strength of the plurality of electronic devices is a threshold value or more, as a recommended AP location of the AP device, among the plurality of measurement locations; and providing, to a user terminal device, the signal strength information that was stored in correspondence to the plurality of measurement locations and an AP location recommendation user interface (UI) configured to display, on the user terminal device, the recommended AP location on the map.

The providing the AP location recommendation UI further includes controlling to display, on the user terminal device, the signal strength information by locations corresponding to the plurality of measurement locations on the map in the AP location recommendation UI.

The providing the AP location recommendation UI further includes: identifying names of the plurality of electronic devices based on corresponding hostnames obtained when wirelessly connecting with the plurality of electronic devices through the AP mode, and controlling to display, on the user terminal device, the identified names of the plurality of electronic devices and the signal strength information corresponding thereto in the AP location recommendation UI.

The control method further includes: receiving an input of an AP location recommendation condition from the user terminal device, wherein the identifying the recommended AP location further includes identifying the recommended AP location based on the signal strength information and further based on the AP location recommendation condition, and wherein the AP location recommendation condition includes at least one from among a type of AP device to be used, whether there is a difference in connection quality for the plurality of electronic devices, and whether a location of an outlet is to be considered.

The AP location recommendation condition includes the type of AP device that is a preinstalled AP device or a relay AP device for extending wireless coverage of the preinstalled AP device, wherein the identifying the recommended AP location further includes identifying, based on the type of AP device being input as the relay AP device, a recommended AP location from among the plurality of measurement locations at which a connection signal strength between the robot cleaner and the preinstalled AP device is a preset value or more, and wherein the AP device is the preinstalled AP device.

The control method further includes: based on the AP location recommendation condition being the location of the outlet, checking a location of an outlet in the space based on an image captured through a camera; and storing the location of the outlet on the map.

The identifying the recommended AP location further includes: identifying the recommended AP location from among the plurality of measurement locations within a preset distance with respect to the location of the outlet stored on the map.

According to an aspect of the disclosure, there is provided a non-transitory computer-readable storage medium storing at least one instruction which, when executed by at least one processor, causes the at least one processor to execute a control method including: storing a map of a space in which a robot cleaner travels; operating in an access point (AP) mode of the robot cleaner in which the robot cleaner outputs a wireless signal corresponding to a wireless signal output value of an AP device; sequentially moving the robot cleaner to a plurality of measurement locations to output the wireless signal through the AP mode and, with respect to the wireless signal, obtain signal strength information related to a connection strength between the robot cleaner and a plurality of electronic devices disposed in the space, respectively, at the plurality of measurement locations; storing the signal strength information in correspondence to the plurality of measurement locations; based on the stored signal strength information, identifying a measurement location at which a signal strength of the plurality of electronic devices is a threshold value or more, as a recommended AP location of the AP device, among the plurality of measurement locations; and providing, to a user terminal device, the signal strength information that was stored in correspondence to the plurality of measurement locations and an AP location recommendation user interface (UI) configured to display, on the user terminal device, the recommended AP location on the map.

The non-transitory computer-readable storage medium, wherein the operating further includes: driving the robot cleaner in a direction in which a connection signal strength with the AP device increases based on an AP location recommendation instruction being input; based on the robot cleaner reaching a preset distance or less with respect to the AP device, starting the AP mode and receiving first signal strength information with respect to the plurality of electronic devices, respectively, based on the wireless signal output through the AP mode and receiving second signal strength information with respect to the plurality of electronic devices, respectively, based on a wireless signal output through the AP device, and adjusting an AP mode output value of the robot cleaner to have a value corresponding to the wireless signal output value of the AP device based on the first signal strength information and the second signal strength information.

The non-transitory computer-readable storage medium, wherein the control method further includes: receiving an input of an AP location recommendation condition from the user terminal device, wherein the identifying the recommended AP location further includes identifying the recommended AP location based on the signal strength information and further based on the AP location recommendation condition, and wherein the AP location recommendation condition includes at least one among a type of AP device to be used, whether there is a difference in connection quality for the plurality of electronic devices, and whether a location of an outlet is to be considered.

The non-transitory computer-readable storage medium, wherein the AP location recommendation condition includes the type of AP device that is a preinstalled AP device or a relay AP device for extending wireless coverage of the preinstalled AP device, wherein the identifying the recommended AP location further includes identifying, based on the type of AP device being input as the relay AP device, a recommended AP location among the plurality of measurement locations at which a connection signal strength between the robot cleaner and the preinstalled AP device is a preset value or more, and wherein the AP device is the preinstalled AP device.

The non-transitory computer-readable storage medium, wherein the control method further includes: based on the AP location recommendation condition being the location of the outlet, checking a location of an outlet in the space based on an image captured through a camera; storing the location of the outlet on the map; and identifying the recommended AP location among the plurality of measurement locations within a predetermined distance with respect to the location of the outlet stored on the map.

BRIEF DESCRIPTION OF THE DRAWINGS

The above and/or other aspects will become apparent and more readily appreciated from the following description of the embodiments, taken in conjunction with the accompanying drawings, in which:

FIG. 9 is a diagram illustrating an embodiment of additionally displaying a required specification according to respective electronic devices in the AP location recommendation UI according to an embodiment;

FIG. 18 is a flowchart illustrating a control method of a robot cleaner according to an embodiment.

DETAILED DESCRIPTION

Embodiments described below are shown as an example to assist in the understanding of the disclosure. However, it is to be understood that various modifications may be made. Herein, in case it is determined that the detailed description of related known technologies may unnecessarily confuse the gist of the described, the detailed description and detailed drawing thereof will be omitted. In addition, the accompanying drawings may be illustrated so that dimensions of some elements are exaggeratedly illustrated and not illustrated to its actual scale.

The terms used herein are general terms selected that are currently widely used considering their function herein. However, the terms may change depending on intention, legal or technical interpretation, emergence of new technologies, and the like of those skilled in the related art. In addition, some terms may be arbitrarily selected. In this case, the meaning of the term may be interpreted according to meaning defined in embodiments, and may be interpreted based on the overall context and the technical common sense according to the related art unless otherwise specified.

As described herein, the order of each step is to be understood as non-limiting unless the order of each step needs to be performed such that a preceding step must be performed logically and temporally prior to a following step. That is, except for exceptional cases as described above, even if a process described as the following step is performed preceding a process described as the preceding step, it does not influence the nature of embodiments and the scope of protection should also be defined regardless of the order of the step.

Herein, expressions such as "comprise," "may comprise," "include," "may include," or the like are used to designate a presence of a corresponding characteristic (e.g., elements such as numerical value, function, operation, or component, etc.), and not to preclude a presence or a possibility of additional characteristics.

As used herein, the terms such as "1st" or "first," "2nd" or "second," etc., may modify corresponding components regardless of importance or order and are used to distinguish one component from another without limiting the components. For example, a first component may be referred to as a second component, and similarly, a second component may also be referred to as a first component. Therefore, the meanings of the elements are not limited by the terms, and the terms are also used just for explaining the corresponding embodiment.

Further, some of the elements of embodiments may be modified or omitted, and other elements may be added. In addition, the elements may be distributed and disposed in different independent devices.

Although few embodiments are described with reference to the accompanied drawings, it is to be understood that this is not limiting.

Certain embodiments will be described in detail below with reference to the accompanied drawings.

Figure 1:
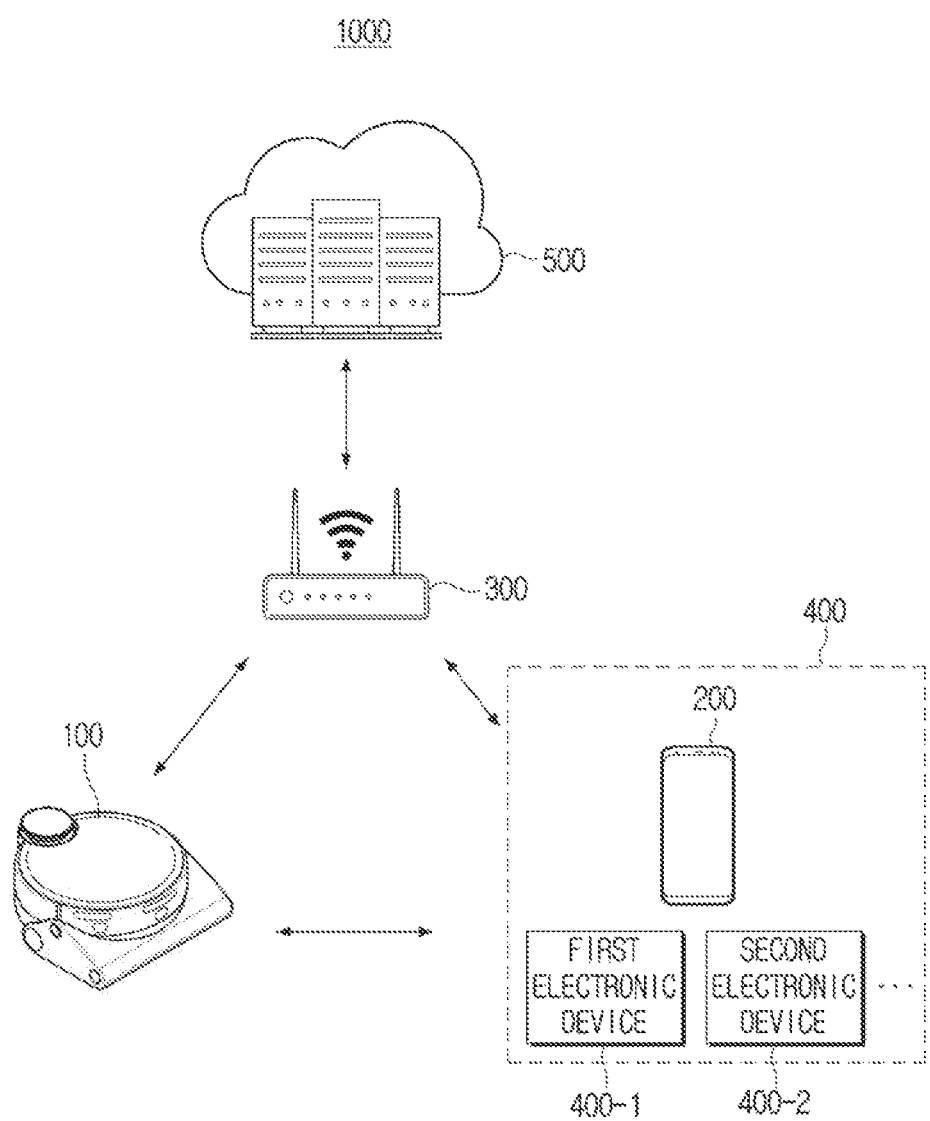
FIG. 1 is a diagram schematically illustrating an AP location recommendation system according to an embodiment.

FIG. 1 is a diagram schematically illustrating an AP location recommendation system according to an embodiment.

Referring to FIG. 1, the AP location recommendation system 1000 may include a robot cleaner 100, a plurality of electronic devices 400, an AP device 300, and a server 500. The plurality of electronic devices 400 may include a user terminal device 200, a first electronic device 400-1, a second electronic device 400-2, etc. The robot cleaner 100, the plurality of electronic devices 400, and the AP device 300 may be disposed in a same space (e.g., within a home).

Here, the plurality of electronic devices 400 may mean home appliances such as, for example, and without limitation, a television (TV), a speaker, a smart speaker, a personal computer (PC), a laptop, a refrigerator, an oven, a cooktop, a microwave, a dishwasher, a washer, a dryer, a clothing treatment apparatus, an air conditioner, an air purifier, and the like, and may include Internet of Things (IoT) devices capable of Wi-Fi communication. In this case, the plurality of electronic devices 400, the robot cleaner 100, and/or the user terminal device 200 may transmit information to and receive information from a server 500 through connection with the AP device 300.

The robot cleaner 100 may operate as a client of a wireless network when connecting with the AP device 300, but may also operate as a wireless network provider through a Soft AP function included in the robot cleaner 100. According to an embodiment, the robot cleaner 100 may be configured to travel in a space outputting a wireless signal corresponding to an output value of the AP device 300, and wirelessly connect with the plurality of electronic devices 400 at a plurality of locations in the space to measure connection strength of the wireless signal.

Accordingly, by using the robot cleaner 100 a location of which is easier to move than a location of the AP device 300, the wireless connection strength, that is, information on the wireless network quality, with the plurality of electronic devices 400 measured at various locations with the same output value as the AP device 300 may be obtained, and by determining an optimal AP installation location capable of covering all of the plurality of electronic devices 400 disclosed at various locations in the space, a recommended AP location may be provided.

However, the device performing the operation described above is not limited to a robot cleaner, and may be implemented to a device of various forms capable of providing a mobility and simultaneously a wireless network like a mobile robot which includes a travelable driving device and the Soft AP function. For example, the device may be implemented as a companion robot, a care robot, a telepresence robot, or the like.

The user terminal device 200 may be a device configured to perform various functions such as providing information to a user or receiving input of a user command, and may be various electronic devices such as a smartphone, a tablet, a wearable device, a PC, or the like.

The server may refer to an electronic device which collects and processes data of an external device. For example, the server 500 may be implemented as a device configured to perform server dedicated functions such as a cloud server, and may be implemented as various electronic devices such as, for example, and without limitation, a smartphone, a tablet, a wearable device, a PC, or the like capable of performing server functions together with other functions. However, this is merely an example, and the server 500 may also be implemented as an electronic device of various types which is not listed above. In addition, the server 500 may be implemented as one device, or implemented as an assembly configured of a plurality of devices. In an example, the server 500 may be a server configured to provide a SmartThings™ service.

Various computations performed by the robot cleaner 100 described herein may be performed through the server 500. In an example, the server 500 may be configured to receive signal strength information on the plurality of electronic devices 400 measured at a plurality of measurement locations from the robot cleaner 100, determine the recommended AP location based on the received information, and transmit the information on the recommended AP location to the robot cleaner 100 or provide to the user terminal device 200.

Figure 2:
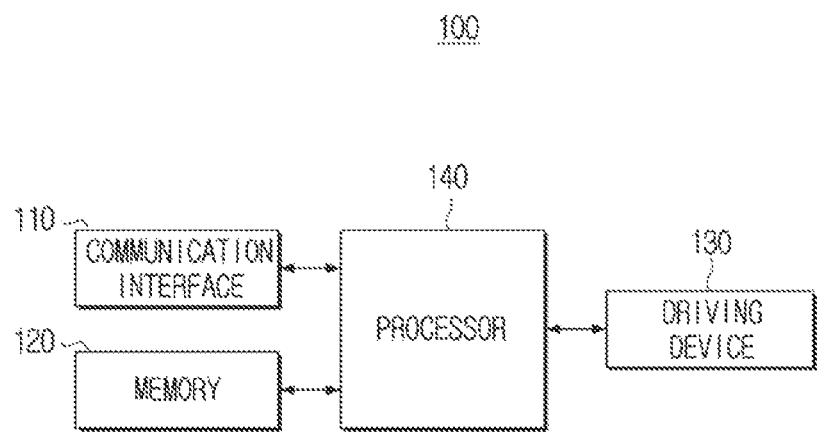
FIG. 2 is a block diagram illustrating a configuration of a robot cleaner according to an embodiment.

FIG. 2 is a block diagram illustrating a configuration of a robot cleaner according to an embodiment.

Referring to FIG. 2, the robot cleaner 100 may include a communication interface 110, a memory 120, a driving device 130, and a processor 140.

The communication interface 110 may transmit and receive various data by performing communication with an extema device. For example, the robot cleaner 100 may be connected to the wireless network provided by the AP device 300 through the communication interface 110 and transmit and receive information with the user terminal device 200, the plurality of electronic devices 400, and the server 500.

The communication interface 110 may be configured to operate in an AP mode which provides a wireless signal through the Soft AP function. Here, the AP mode may be a mode of operating so as to provide a wireless network connection such as Wi-Fi to a different client device such as an AP device by the robot cleaner 100 which normally functions as a client device implementing the role of a wireless AP through a software. The communication interface 110 may provide the wireless network with the user terminal device 200 and the plurality of electronic devices 400 by operating with the AP device through the software stored in the memory 120.

The communication interface 110 may be configured to operate in the AP mode which outputs the wireless signal corresponding to the output value of the AP device 300. Accordingly, based on adjusting the AP mode output of the robot cleaner to have a wireless network performance similar to the output value of the AP device based on which the user intends to measure the wireless connection quality, reliability of an AP location recommendation function may be enhanced. The detailed description on the operation of adjusting the output value of the AP mode so that the communication interface 110 is configured to output a wireless signal corresponding to the output value of the AP device 300 will be described below with reference.

The communication interface 110 may be configured to perform communication with internal devices through a local area network (LAN), an Internet network, or a mobile communication network, and with external devices through various communication methods such as, for example, and without limitation, Bluetooth (BT), Bluetooth Low Energy (BLE), Wireless Fidelity (Wi-Fi), Wi-Fi Direct, ZigBee, NFC, and the like. To this end, the communication interface 110 may include various communication modules for performing network communication. For example, the communication interface 110 may include a Bluetooth chip, a Wi-Fi chip, a wireless communication chip, and the like.

The memory 120 may be electrically connected with the processor 140, and may be configured to store various data.

Specifically, the memory 120 may be store a map which the robot cleaner 100 generates by traveling a space. In addition, the memory 120 may be store signal strength information of the plurality of electronic devices received on the wireless signal output through the AP mode of the communication interface 110.

The memory 120 may be configured to store instructions or data associated with at least one other element of the robot cleaner 100. The memory 120 may be implemented as a non-volatile memory, a volatile memory, a flash-memory, a hard disk drive (HDD), a solid state drive (SDD), or the like. The memory 120 may be accessed by the processor 140, and reading/writing/modifying/deleting/updating of data by the processor 140 may be performed. Herein, the term 'memory' may include the memory 120, a read only memory (ROM) in the processor 140, a random access memory (RAM), or a memory card (e.g., a micro SD card, a memory stick) mounted to the robot cleaner 100.

The driving device 130 may be a configuration for moving the robot cleaner 100. For example, the driving device 130 may include wheels installed at the respective left side and right side of a main body of the robot cleaner 100 and a motor for driving the wheels. Accordingly, the driving device 130 may be configured to perform various traveling operations such as moving, stopping, speed control, change in direction, change in angular velocity, and the like of the robot cleaner 100.

The processor 140 may be electrically connected with the communication interface 110, the memory 120, and the driving device 130, and may be configured to control the overall operation of the robot cleaner 100.

According to an embodiment, the processor 140 may be configured to control the driving device 130 so that the robot cleaner 100 sequentially moves to the plurality of measurement locations to measure the wireless signal output through the AP mode of the communication interface 110 and the connection strengths between the plurality of electronic devices 400 disposed in the space at which the robot cleaner 100 is located.

The processor 140 may be configured to store, based on signal strength information on the wireless signal output through the AP mode of the communication interface 110 being received from the plurality of electronic devices 400 in the plurality of measurement locations to which the devices were moved through the driving device 130, the received signal strength information in the memory 120 by the respective measurement locations.

The processor 140 may be configured to determine the measurement location at which the signal strength received from the plurality of electronic devices 400 is a threshold value or more as the recommended AP location of the AP device 300.

Further, the processor 140 may be configured to control the communication interface 110 to provide an AP location recommendation user interface (UI) which displays the signal strength information stored by the respective measurement locations and the recommended AP location on a map to the user terminal device 200. However, this is not limiting and the AP location recommendation UI may be generated by the user terminal device 200 based on the information provided by the processor 140.

Accordingly, the AP location recommendation UI may be displayed through a display of the user terminal device 200, and by displaying the recommended AP location on the map prepared by the robot cleaner 100, and an intuitive AP location recommendation function may be provided to the user by displaying the recommended AP location on the map prepared by the robot cleaner 100.

To this end, the processor 140 may be implemented as a digital signal processor (DSP), a microprocessor, or a time controller (TCON) that processes a digital signal. However, the embodiment is not limited thereto, and may include one or more from among a central processing unit (CPU), a micro controller unit (MCU), a micro processing unit (MPU), a controller, an application processor, a communication processor (CP), an ARM processor, or an artificial intelligence (AI) processor, or may be defined by the corresponding term. In addition, the processor 140 may be implemented as a System on Chip (SoC) or large scale integration (LSI) embedded with a processing algorithm, and may be implemented in the form of a field programmable gate array (FPGA). The processor 140 may be configured to perform various functions by executing computer executable instructions stored in the memory 120.

Figure 3:
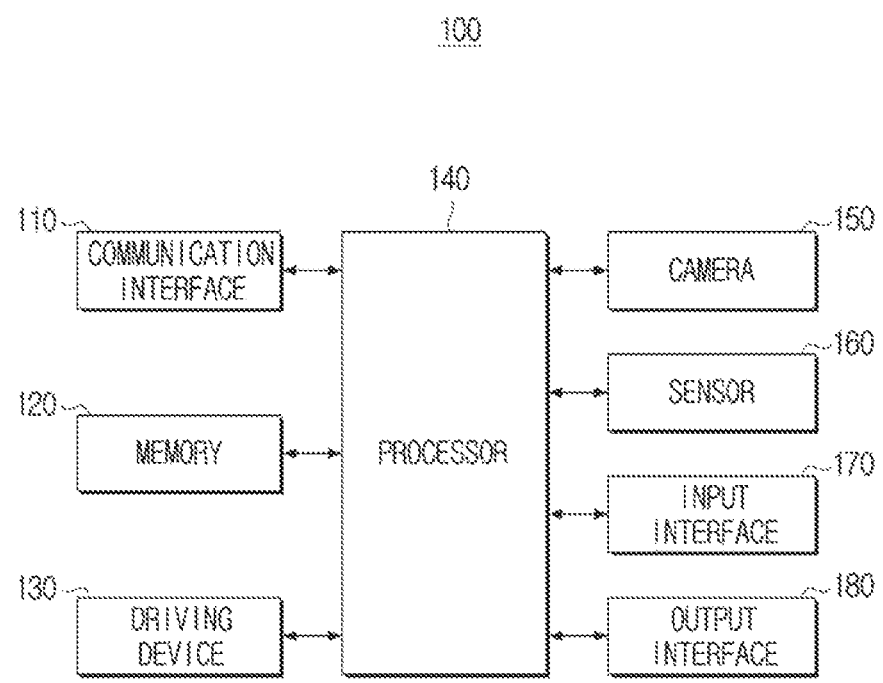
FIG. 3 is a block diagram illustrating a detailed configuration of a robot cleaner according to an embodiment.

FIG. 3 is a block diagram illustrating a detailed configuration of a robot cleaner according to an embodiment.

Referring to FIG. 3, the robot cleaner 100 may include a communication interface 110, a memory 120, a driving device 130, a processor 140, a camera 150, a sensor 160, an input interface 170, and an output interface 180. The detailed description on parts overlapping with the configurations illustrated in FIG. 2 from among the configurations illustrated in FIG. 3 will be omitted.

The camera 150 may be a configuration for capturing a subject and generating a captured image, and the captured image may include both a moving image and a still image. The camera 150 may be configured to obtain an image which captured the surroundings of a space in which the robot cleaner 100 is located, and may be implemented as an imaging element, a lens, an infrared sensor, or the like.

The sensor 160 may be configured to obtain various information associated with the robot cleaner 100 and the surroundings of the robot cleaner 100. The sensor 160 may be configured to transmit an electrical signal to the processor 140, or store a detection result in the memory 120 of the robot cleaner 100 or in an external device.

Here, the sensor 160 may include a light detection and ranging (LIDAR) sensor (or, a laser distance sensor (LDS)). For example, the LIDAR sensor may irradiate a laser rotating 360 degrees, and based on the irradiated laser being received by reflecting from an object in the surroundings of the robot cleaner 100, detect a distance with the object based on the time at which the laser is received, or detect the distance with the object by measuring an amount of change in phase of the received laser. The processor 140 may be configured to prepare a map of the space based on the detection result obtained through the sensor 160, and generate a travel route.

The input interface 170 may be configured to receive input of various user commands. For example, the input interface 170 may be configured to receive input of the user command for controlling the robot cleaner 100. The input interface 170 may include a physical button for receiving input of the user command, a microphone for receiving input of a user uttered speech, and a display for receiving input of the user command through a touch screen.

The output interface 180 may include at least one of a display and a speaker. Here, the display may be a device configured to output information in visual form (e.g., text, image, etc.). The display may be configured to display an image frame in a whole or a portion of an area of a display area. The display area may denote the whole area in pixel unit in which information or data is visually displayed. The speaker may be a device configured to output information in auditory format (e.g., speech). The speaker may be configured to not only output various audio data performed with various processing work such as decoding, amplifying, or noise filtering by an audio processor, but also output various notification sounds or speech messages directly in sound.

Figure 4:
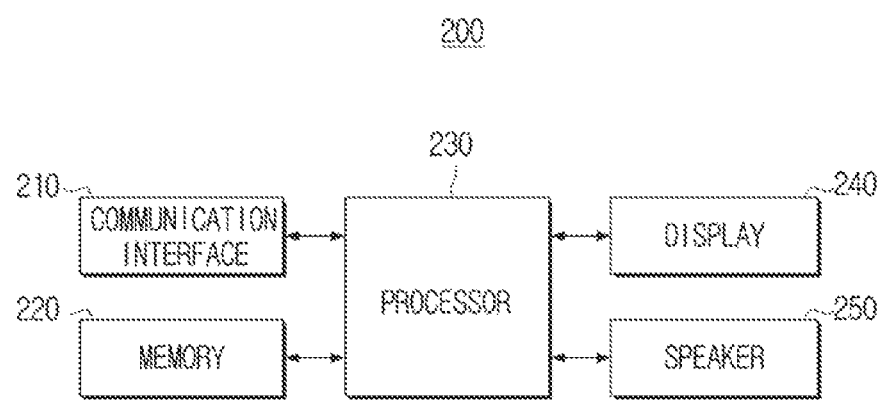
FIG. 4 is a block diagram illustrating a configuration of a user terminal device according to an embodiment.

FIG. 4 is a block diagram illustrating a configuration of a user terminal device according to an embodiment.

Referring to FIG. 4, the user terminal device 200 may include a communication interface 210, a memory 220, a processor 230, a display 240, and a speaker 250.

The communication interface 210 may be configured to communicate with the robot cleaner 100 and the plurality of electronic devices 400, and transmit and receive various information by communicating with external devices such as the server 500 through the network connection of the AP device 300. The communication interface 210 may be configured to transmit a signal for controlling the robot cleaner 100 such as an AP location recommendation instruction, and receive input of an AP location recommendation condition and transmit to the robot cleaner 100.

Here, the AP location recommendation condition may be a condition for determining the recommended AP location, and may include the type of AP device to be installed, whether there is a difference in connection quality for the respective electronic devices, whether a location of an outlet has been considered, and the like.

As an example of the AP location recommendation condition, the user may input the type of AP device to be installed. The type of AP device to be installed may be selected from among a first AP device which is the same as the preinstalled AP device 300 or a second AP device (e.g., an extender or a relay) for extending the wireless coverage of the preinstalled AP device 300. For example, the second AP device may be selected to be used in addition to the preinstalled AP device, e.g., for extending the service. When the extender or the relay is installed, because the wireless signal is received from the preinstalled AP device 300 and the wireless signal is output again from the an extender or a relay at a location where the wireless signal was received, the second AP device may be disposed in the wireless coverage area of the preinstalled AP device 300. Accordingly, the robot cleaner 100 may be configured to determine, based on receiving an input of the second AP device to be used, that is, the extender or the relay, the recommended AP location from among the measurement locations at which the connection signal strengths with the preinstalled AP device 300 are a preset value or more. The detailed description with respect to the above will be described below with reference to FIGS. 11 and 12.

As another example of the AP location recommendation condition, the user may set whether there is a difference in connection quality for the respective electronic devices. The detailed description with respect to the above will be described below with reference to FIGS. 13 to 15.

As still another example of the AP location recommendation condition, the user may set whether the location of the outlet has been considered. When installing the AP device, there are many instances in which the AP device is to be installed near the location at which the outlet is actually disposed in order to supply power to the AP device. If setting is performed so that the user considers the output location, the robot cleaner may be configured to determine the recommended AP location from among the measurement locations located within the preset distance with respect to the location of the outlet. Accordingly, the actual location to which the AP device, which requires power connection through the outlet, may be installed may be provided as the recommended AP location.

In this case, the outlet location may be input directly by the user on the map generated by the robot cleaner, and stored on the map based on the image captured through the camera of the robot cleaner. The detailed description with respect to the above will be provided below with reference to FIGS. 16 and 17.

Meanwhile, the memory 220, the processor 230, the display 240, and the speaker 250 may be configurations similar to the configurations described in FIG. 3. Accordingly, redundant descriptions will be omitted.

Figure 5:
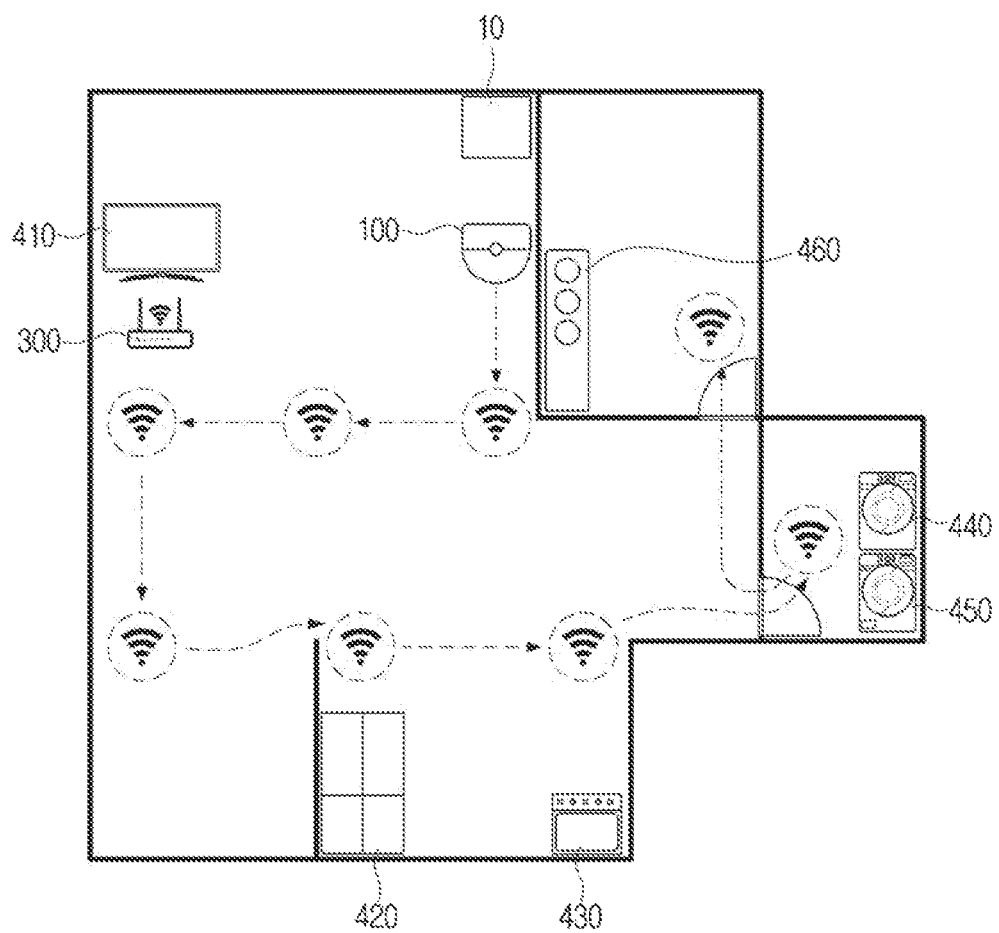
FIG. 5 is a diagram illustrating an operation of a robot cleaner moving sequentially to a plurality of measuring locations operating in an AP mode according to an embodiment.

FIG. 5 is a diagram illustrating an operation of a robot cleaner moving sequentially to a plurality of measuring locations operating in an AP mode according to an embodiment.

Referring to FIG. 5, on the map generated by the robot cleaner 100, the location of the robot cleaner 100, a station 10 of the robot cleaner, the AP device 300, and the plurality of electronic devices 400 including electronic devices 410, 420, 430, 440, 450 and 460 may be displayed. The location of the respective devices may be input by the user, or estimated by detecting the respective electronic devices 410, 420, 430, 440, 450 and 460 through a local area communication (UWB, Wi-Fi RTT, etc.) of the robot cleaner 100. For example, the robot cleaner 100 may be configured to estimate the location of the electronic device disposed in the space through an Angle of Arrival (AoA) and Time of Flight (ToF) of a signal received through the local area communication. The robot cleaner 100 may be configured to estimate the location of the electronic device by analyzing whether an image corresponding to the electronic device is included in the image captured through the camera. In addition, the robot cleaner 100 may be configured to combine the methods of location estimation according to the local area communication and the location estimation through camera capturing and estimate the location of the electronic device.

The robot cleaner 100 may be configured to sequentially move to the plurality of measurement locations located in the space. In this case, the robot cleaner 100 may be configured to move along a pre-stored travel route, and receive signal strength information from the respective electronic devices 410, 420, 430, 440, 450 and 460 after stopping at the respective measurement locations on the travel route.

The plurality of measurement locations may be determined automatically in the robot cleaner 100 or the server 500. For example, the robot cleaner 100 or the server 500 may be configured to determine the plurality of locations spaced apart by a certain distance on the pre-stored travel route of the robot cleaner 100 as the plurality of measurement locations. Meanwhile, on the map provided in the UI on a display screen of the user terminal device 200, the user may determine the plurality of measurement locations through a touch input. Further, in addition to the plurality of measurement locations determined automatically in robot cleaner 100 or the server 500, the user may add a measurement location by touch inputting with respect to the location on the map.

In order to provide a more reliable AP location recommendation function on an installation location of the AP device 300, there may be a need to adjust the output value of the wireless signal being output through the AP mode of the robot cleaner 100 to be within the same range as the output value of the AP device.

Figure 6:
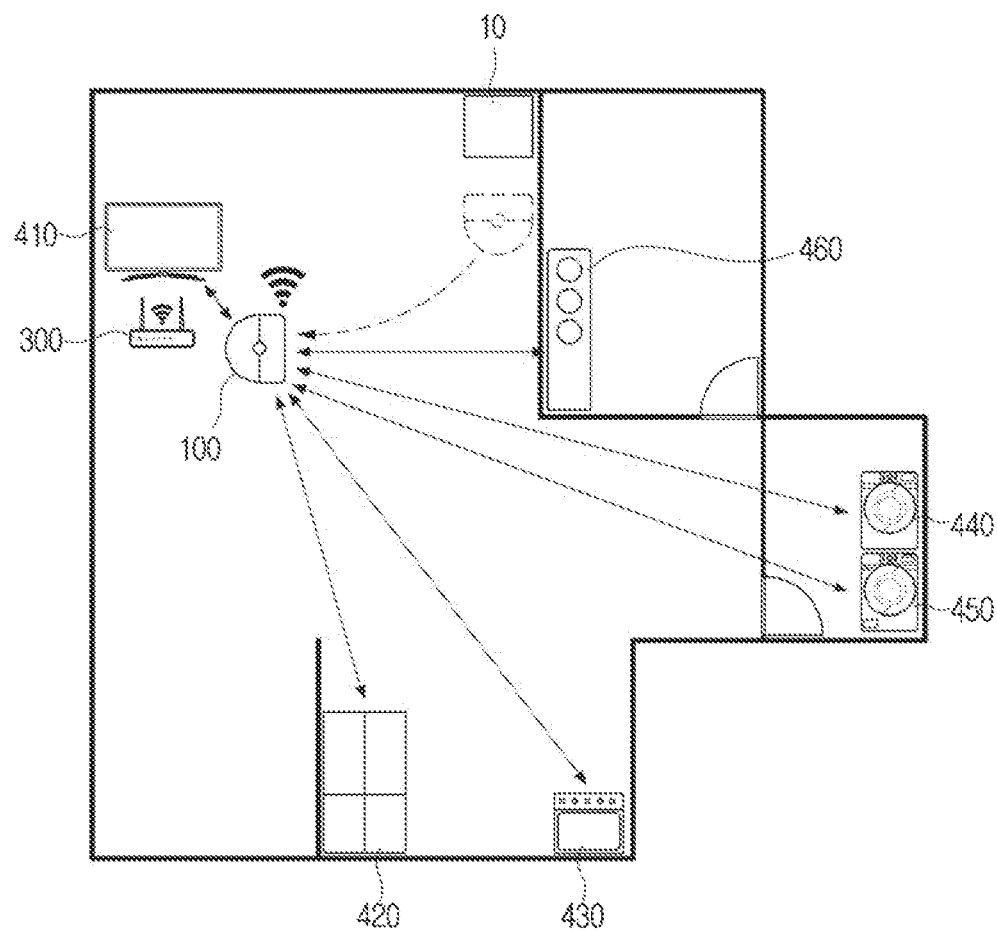
FIG. 6 is a diagram illustrating an operation of adjusting an AP mode output value so that a robot cleaner is configured to output a wireless signal corresponding to an output value of an AP device according to an embodiment.
Figure 7:
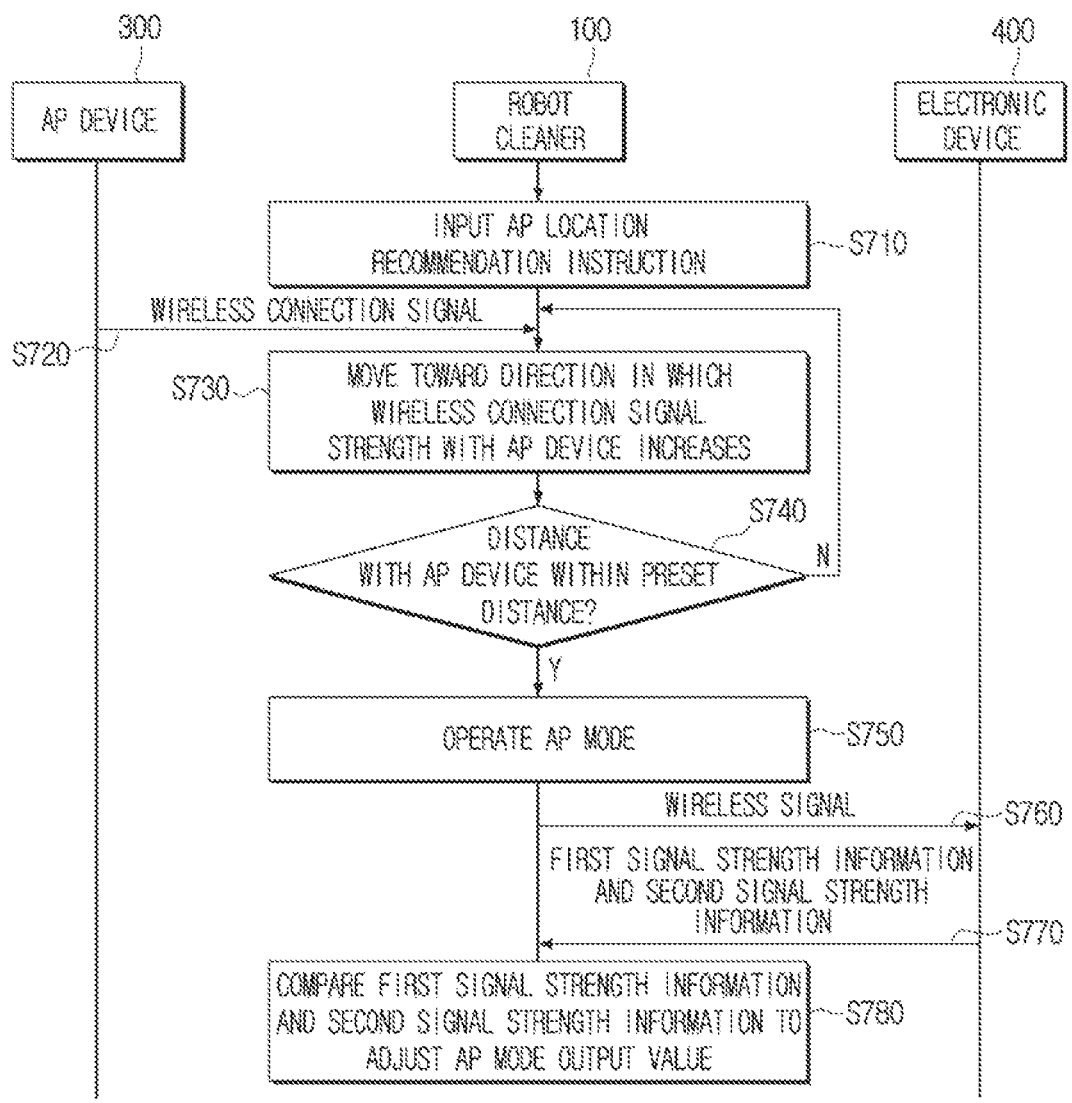
FIG. 7 is a flowchart illustrating an operation of adjusting an AP mode output value of a robot cleaner according to an embodiment.

FIGS. 6 and 7 are diagrams illustrating an operation of adjusting an AP mode output value so that a robot cleaner is configured to output a wireless signal corresponding to an output value of an AP device according to an embodiment.

Referring to FIGS. 6 and 7, the robot cleaner 100 may be configured to move from an initial location to a direction the AP device is located based on the AP location recommendation instruction being input (Operation S710). Specifically, the robot cleaner 100 may be configured to move in a direction in which the wireless connection signal strength increases with the AP device 300 (Operation S730) according to the wireless connection signal received from the AP device 300 (Operation S720) based on the AP location recommendation instruction being input, and identify whether the distance with the AP device 300 is within the preset distance (Operation S740).

The robot cleaner 100 may be configured to stop when it reaches the preset distance or less from the AP device 300. The robot cleaner 100 may be configured to output the wireless signal by operating the AP mode (Operations S750, S760) and receive a first signal strength information on the wireless signal output through the AP mode from the plurality of electronic devices 410, 420, 430, 440, 450 and 460 while in a stopped state at a location adjacent to the location of the AP device 300. In addition, the robot cleaner 100 may be configured to receive a second signal strength information, which is signal strength information when the plurality of electronic devices 410, 420, 430, 440, 450 and 460 are wirelessly connected with the respective AP devices 300, from the plurality of electronic devices 410, 420, 430, 440, 450 and 460 (Operation S770).

The robot cleaner 100 may be configured to compare the first signal strength information and the second signal strength information, change the AP mode output value, and adjust to output value of the AP mode so that it is within the same range as the second signal strength information (Operation S780).

Accordingly, the AP mode output of the robot cleaner 100 may be adjusted to have a similar wireless network performance as with the output value of the AP device 300 which the user intends to measure the wireless connection quality.

Figure 8:
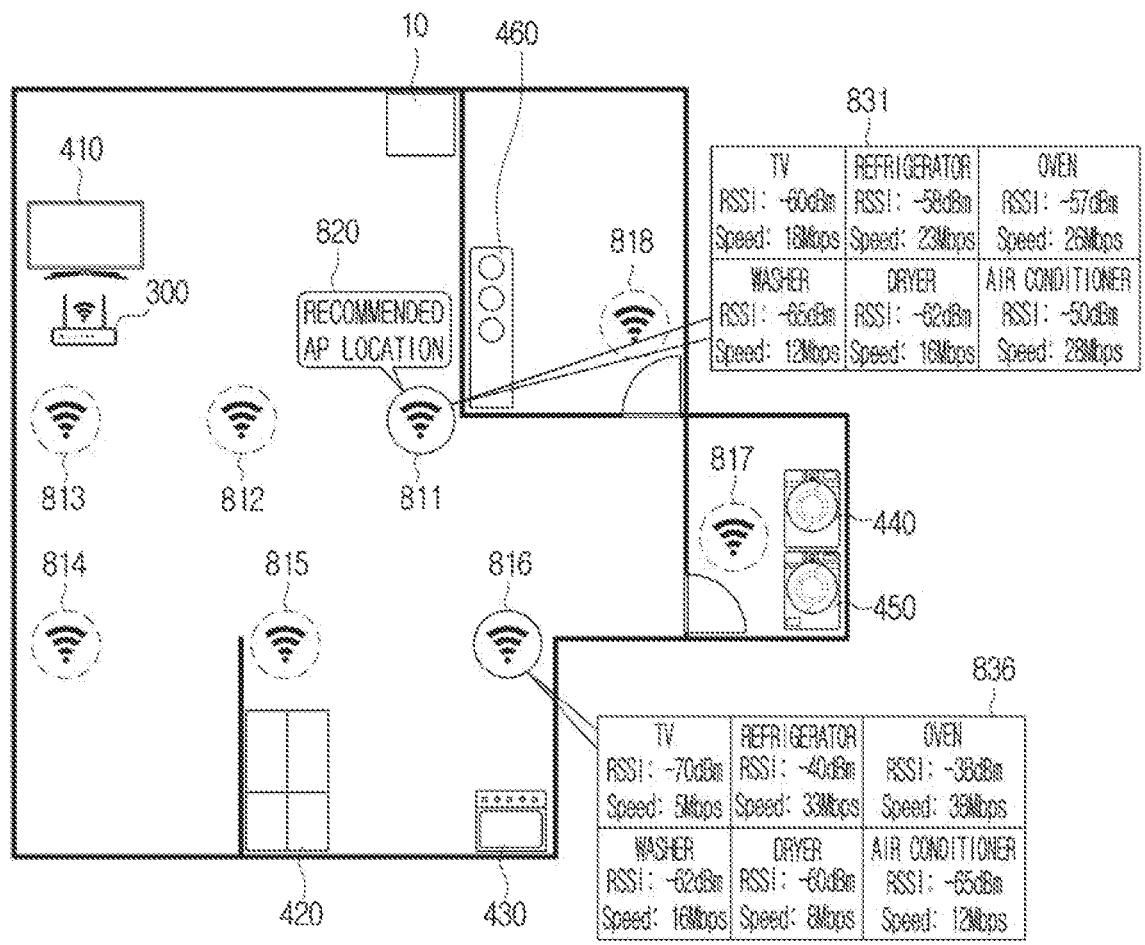
FIG. 8 is a diagram illustrating an AP location recommendation UI according to an embodiment.

FIG. 8 is a diagram illustrating an AP location recommendation UI according to an embodiment.

Referring to FIG. 8, the AP location recommendation UI according to an embodiment may be configured to mark and provide signal strength information 831 and 836 received for respective measurement locations 811, 812, 813, 814, 815, 816, 817 and 818 and the recommended AP location 820 on the map.

For example, the AP location recommendation UI may be configured to display the signal strength information received from the corresponding measurement locations based on the touch input on any one from among the plurality of measurement locations 811, 812, 813, 814, 815, 816, 817 and 818 being received. In this case, the signal strength information may include a Received Signal Strength Indication (RSSI) and a transmission rate (Speed, or Throughout), and may be configured to display all signal strength information received from the respective electronic devices 410, 420, 430, 440, 450 and 460.

The AP location recommendation UI may be configured to display the required specification for a smooth wireless communication of the respective electronic devices with the signal strength information.

FIG. 9 is a diagram illustrating an embodiment of additionally displaying a required specification according to respective electronic devices in the AP location recommendation UI of FIG. 8.

Referring to FIG. 9, the signal strength information 910 and 920 displayed through the AP location recommendation UI may display the required specification of the respective electronic devices. In addition, with respect to the electronic device which satisfies the required specification, that is, the electronic device of which the RSSI and the transmission speed are measured higher than the required specification, an indicator representing that the required specification is satisfied may be displayed (refer to 910). With respect to the electronic device which fails to satisfy the required specification, that is, the electronic device of which the RSSI and the transmission speed are measured lower than the required specification, an indicator representing that the required specification is not satisfied may be displayed (referring to 920). In this case, the recommended AP location may be determined to a center of the measurement location which satisfies the required specification with respect to all electronic devices.

Figure 10:
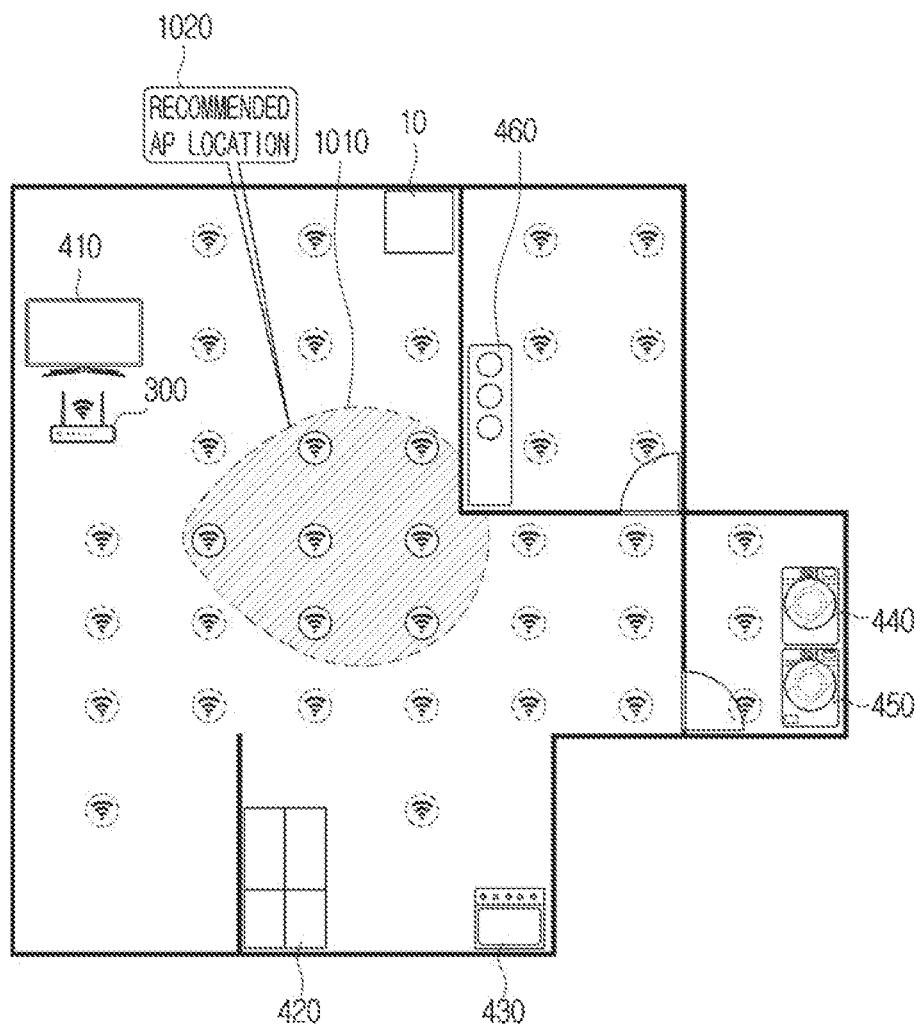
FIG. 10 is a diagram illustrating an embodiment of displaying a recommended AP area in an AP location recommendation UI according to an embodiment.

The AP location recommendation UI according to an embodiment may be configured to display the recommended AP location as an area on the map. For example, referring to FIG. 10, the AP location recommendation UI may be configured to display a recommended AP area 1010 including multiple recommended AP locations which satisfy the AP location recommendation condition as the recommended AP location 1020 on the map.

The processor 140 may be configured to identify names of the plurality of electronic devices 410, 420, 430, 440, 450 and 460 based on a hostname obtained when wirelessly connecting with the plurality of electronic devices 410, 420, 430, 440, 450 and 460 through the AP mode, and the name of the identified electronic device and the signal strength information corresponding thereto may be displayed in the AP location recommendation UI.

Accordingly, the wireless connection strength on the respective electronic devices may be intuitively provided to the user through the AP location recommendation UI, and further the recommended AP location determined to an optimal AP installation location from among the plurality of measurement locations may be provided on the map.

Figure 11:
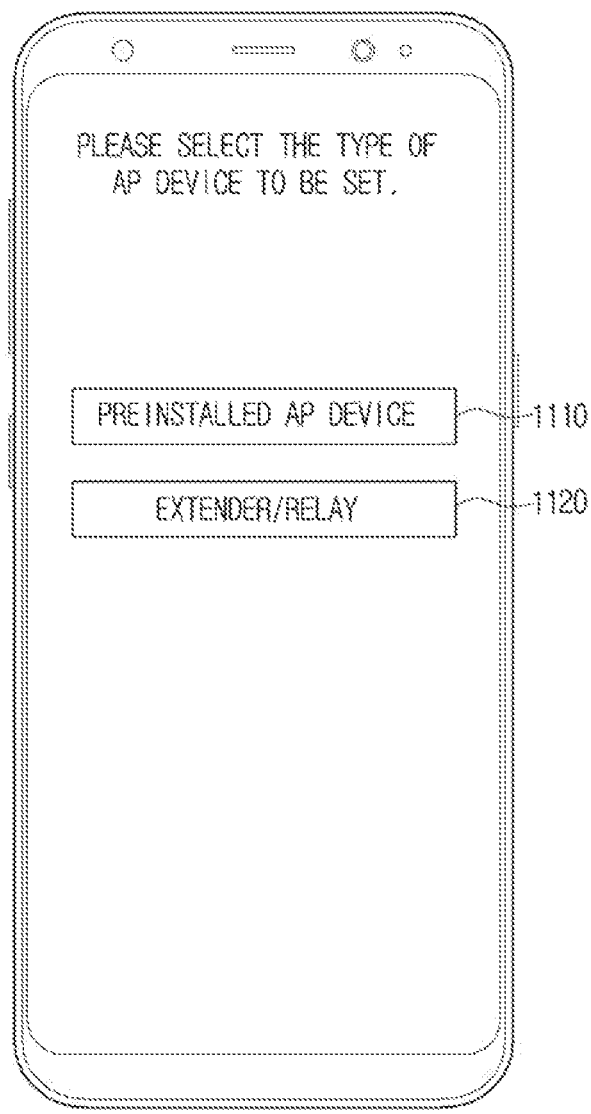
FIG. 11 is a diagram illustrating an operation of selecting a type of AP device to be installed through a user terminal device according to an embodiment.
Figure 12:
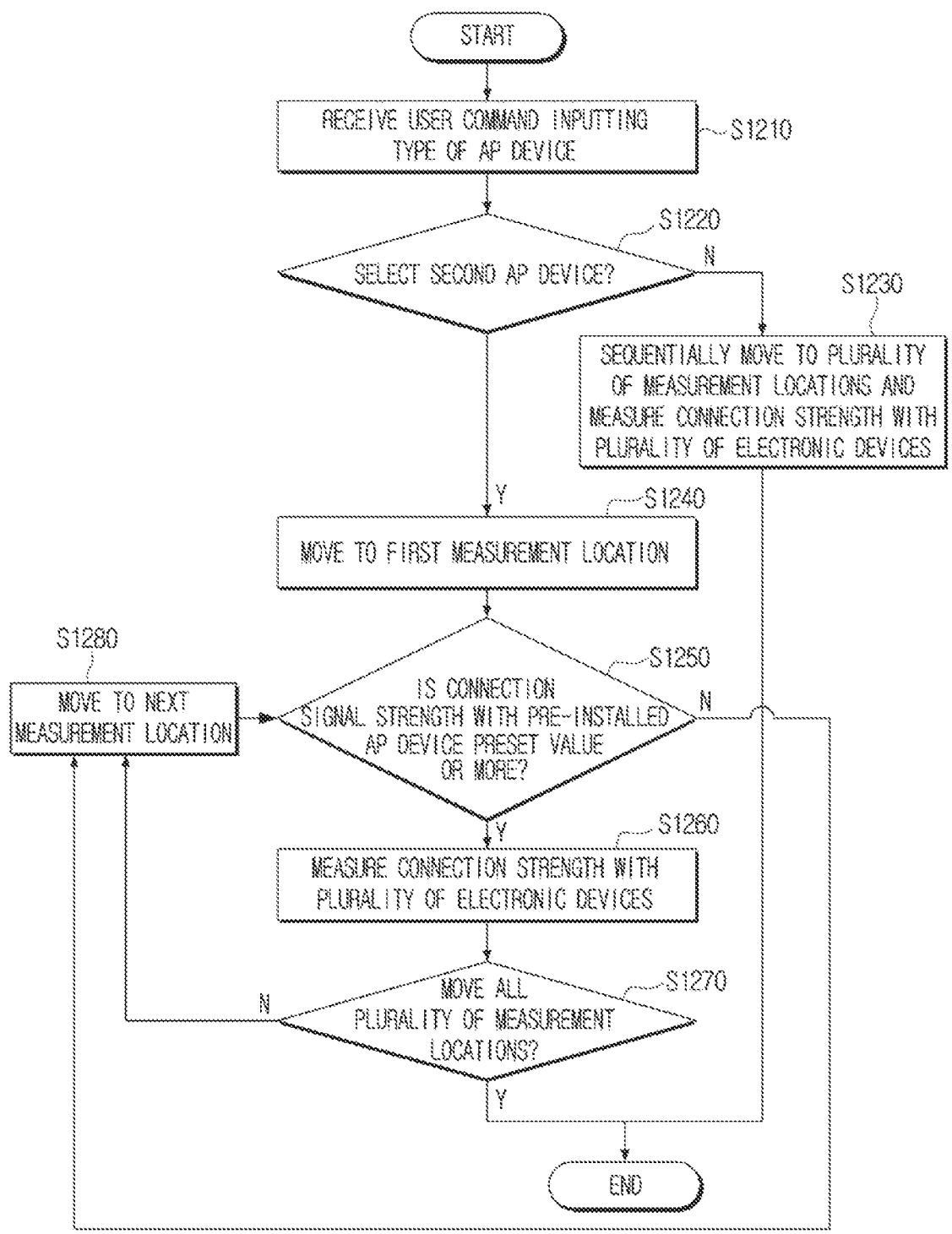
FIG. 12 is a flowchart illustrating an operation of a robot cleaner according to a type of a selected AP device according to an embodiment.

FIG. 11 is a diagram illustrating an operation of selecting a type of AP device to be installed through a user terminal device, and FIG. 12 is a flowchart illustrating an operation of a robot cleaner according to a type of a selected AP device.

Referring to FIG. 11, the user terminal device 200 may be configured to provide UIs 1110 and 1120 for receiving input of the type of AP device to be installed. The type of AP device to be installed may be selected from among a first AP device, e.g., the preinstalled AP device 300, or a second AP device (e.g., the extender or the relay) for extending the wireless coverage of the preinstalled AP device 300.

The robot cleaner 100 may be configured to receive information on the type of AP device to be installed from the user terminal device 200. Referring to FIG. 12, the robot cleaner 100 may be configured to receive the user command inputting the type of AP device to be used (Operation S1210), and sequentially move to the plurality of measurement locations when the first AP device is selected (that is, when the second AP device is not selected in S1220) and measure the connection strength with the plurality of electronic devices (Operation S1230).

The robot cleaner 100 may be configured to move, based on the second AP device being selected, to a first measurement location from among the plurality of measurement locations (Operation S1240). Further, the robot cleaner 100 may be configured to measure, based on the connection signal strength with the preinstalled AP device 300 being the preset value or more from the moved measurement location (Operation S1250), the connection strength with the plurality of electronic devices (Operation S1260). The robot cleaner 100 may be configured to cancel, based on the connection signal strength being smaller than the preset value, the process of measuring the connection strength with the plurality of electronic devices and move to a next measurement location. Accordingly, by measuring the connection strength with the plurality of electronic devices at only the location in which the electronic device may be disposed within the wireless coverage area of the preinstalled AP device 300, measurement time spent may be reduced.

The robot cleaner 100 may be configured to determine whether it has moved to all of the plurality of measurement locations (Operation S1270), move to the next measurement location (Operation S1280) if there is a measurement location which has not been moved to, identify whether the connection signal strength with the preinstalled AP device is the preset value or more from the respective measurement locations, and repeat and perform the operation of measuring the connection strength with the plurality of electronic devices.

Figure 13:
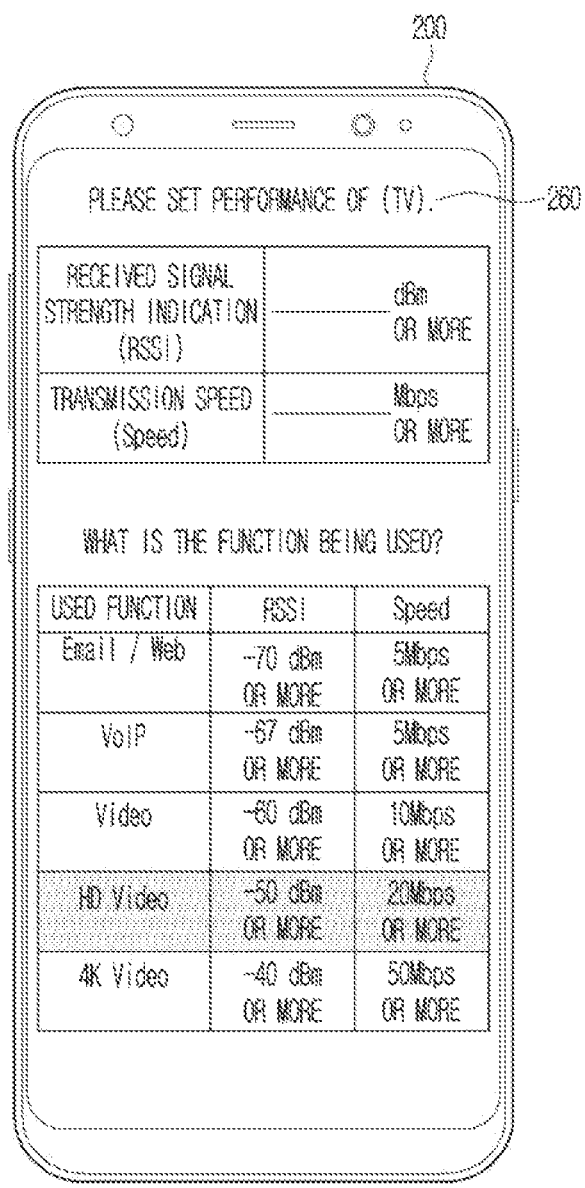
FIG. 13 is a diagram illustrating an operation of setting a connection quality of an electronic device through a user terminal device according to an embodiment.

FIG. 13 is a diagram illustrating an operation of setting a connection quality of an electronic device through a user terminal device.

When determining the recommended AP location, although a wireless connection importance of an equivalent degree may be added with respect to all electronic devices by determining the measurement location at which the signal strength received from the plurality of electronic devices all satisfy the same threshold value or more as the recommended AP location, there may be an instance in which wireless connection quality of high intensity may be required according to the function used by the respective electronic devices being different.

Referring to FIG. 13, the user may set the performance to a desired degree by the respective electronic devices through the UI 260 of the user terminal device 200. In this case, any one (e.g., TV) from among the plurality of electronic devices may be selected, and the recommended AP location which satisfies the input recommended condition may be provided by inputting the desired RSSI and the transmission speed when the TV is wirelessly connected.

The user terminal device 200 may be configured to receive the recommended condition according to the function used through the electronic device through the UI. For example, based on the user trying to use the function of playing back a high-definition (HD) image through the TV, when the "HD Video" is selected, the measurement location in which the RSSI is 50 dBm or more, and the transmission speed is 20 Mbps or more may be provided as the recommended AP location with respect to the TV.

Figure 14:
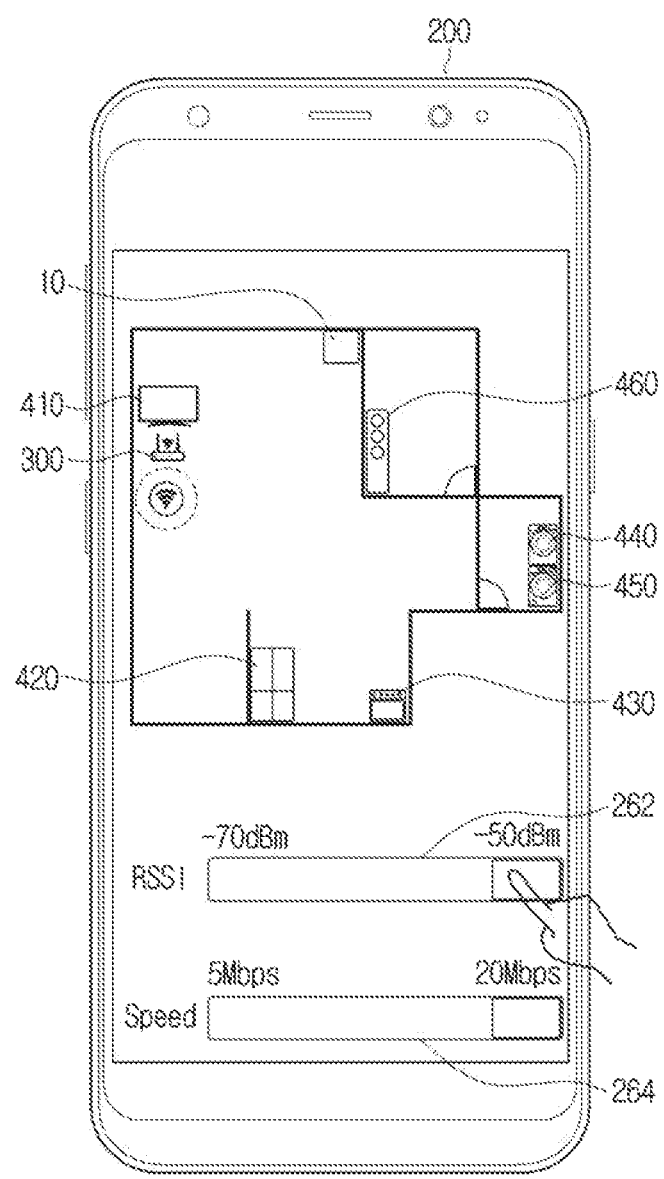
FIG. 14 is a diagram illustrating a UI which provides a recommended AP location by changing AP location recommendation conditions according to a user input from an AP location recommendation UI according to an embodiment.
Figure 15:
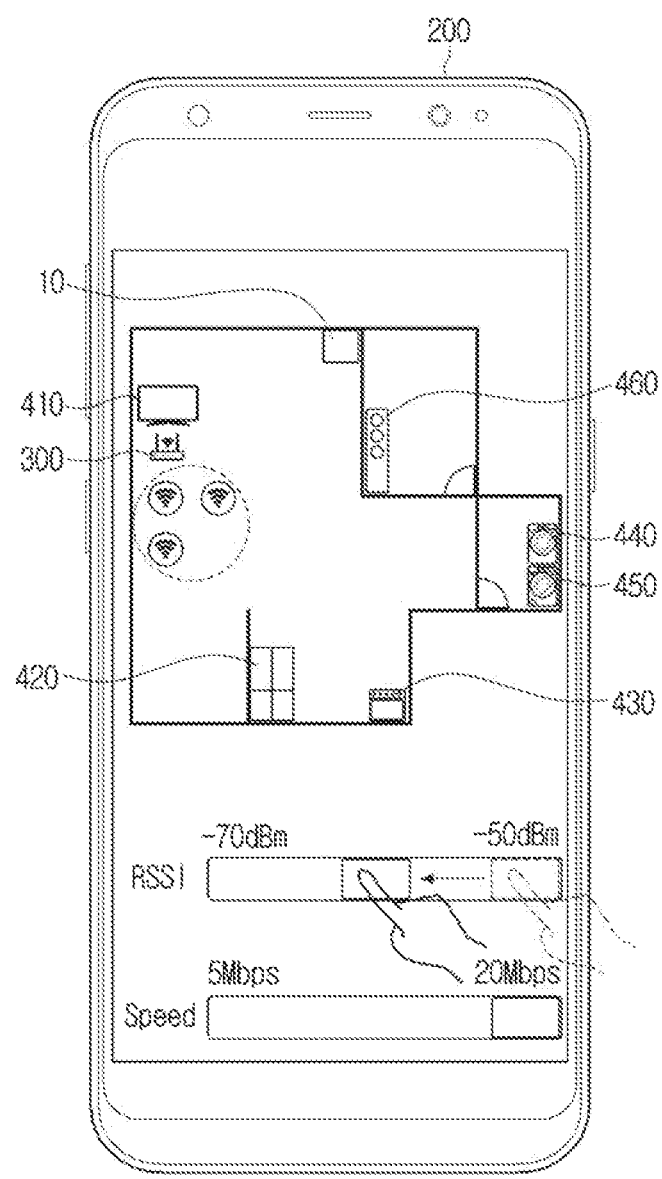
FIG. 15 is a diagram illustrating a UI provided with a recommended AP location changed according to the user input according to an embodiment.

FIG. 14 is a diagram illustrating a UI which provides a recommended AP location by changing AP location recommendation conditions according to a user input from an AP location recommendation UI according to an embodiment, and FIG. 15 is a diagram illustrating a UI provided with a recommended AP location changed according to the user input in FIG. 14.

Referring to FIG. 14, based on setting the RSSI or the transmission speed of a higher intensity being set with respect to the TV, it may be verified that there is only one measurement location present which satisfies the condition. In this case, the user may change the setting condition on the received signal strength indication (RSSI) or the transmission speed through a scroll included in the UI 262, 264 of the user terminal device 200, and check the changed recommended AP location. In an example, the user may touch the UI of a bar shape in a sliding method to continuously change the setting value of the RSSI or the transmission speed. The user may respectively adjust the setting values of the RSSI or the transmission speed or adjust only one.

Referring to FIG. 15, based on the user lowering the RSSI setting value through the scroll, it may be verified that a greater selection of recommended AP locations is being provided. The user may change the transmission speed setting value by a similar method.

Figure 16:
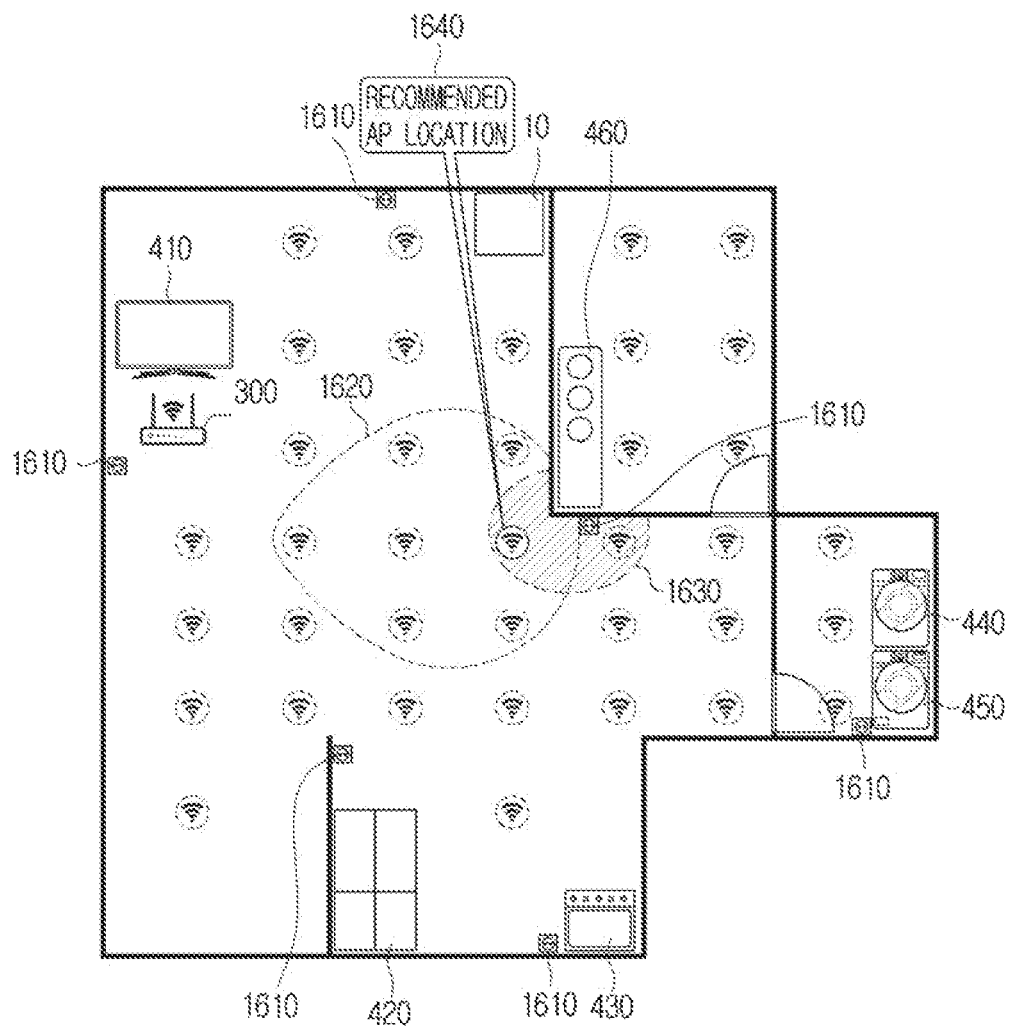
FIG. 16 is a diagram illustrating a UI which provides a recommended AP location taking into consideration a location of an outlet in a space according to an embodiment.
Figure 17:
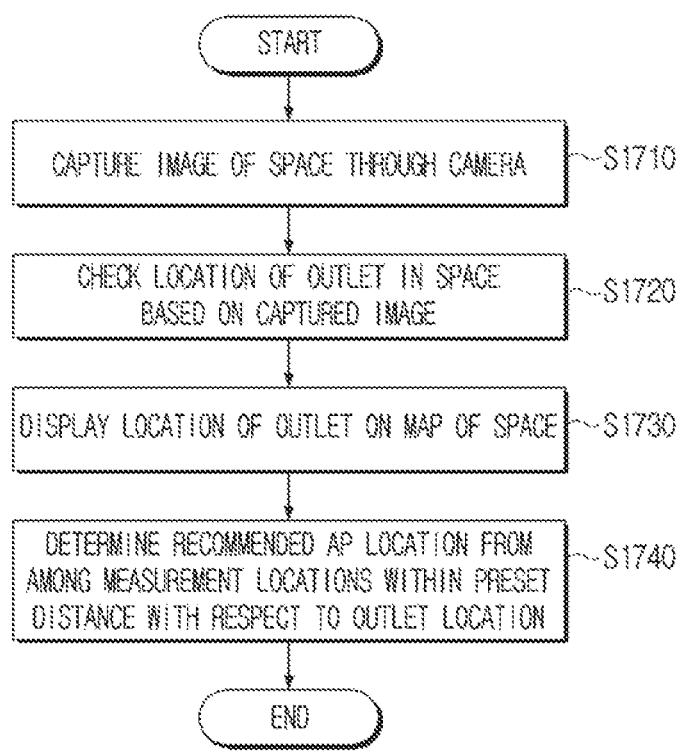
FIG. 17 is a flowchart illustrating an operation of a robot cleaner checking a location of an outlet and determining a recommended AP location based on the location of the outlet according to an embodiment.

FIGS. 16 and 17 are diagrams illustrating an operation of a robot cleaner determining a recommended AP location considering a location of an outlet in a space according to an embodiment.

Referring to FIG. 16, the AP location recommendation UI may display the outlet location 1610 on the map, and display the determined recommended AP location from among the measurement locations within the preset distance with respect to the output location.

Specifically, referring to FIG. 17, the robot cleaner 100 may be configured to capture an image of the space through the camera (Operation S1710). Further, the robot cleaner 100 may be configured to verify the location of the outlet in the space based on the captured image (Operation S1720). Specifically, the robot cleaner 100 may be configured to analyze the captured image to identify the area corresponding to the image of the outlet, and store the location of the outlet on the map based on location information of the captured image. Meanwhile, the user may directly input the location of the outlet on the map displayed through the user terminal device 200.

The user terminal device 200 may be configured to display the location of the outlet on the map of the space (Operation S1730). In an example, as illustrated in FIG. 16, the outlet location 1610 may be displayed on the map through the AP location recommendation UI.

The robot cleaner 100 may be configured to determine the recommended AP location from among the measurement locations within the preset distance with respect to the outlet location (Operation S1740). Referring to FIG. 16, the measurement location included in the recommended AP area 1620 which satisfies the RSSI or the transmission speed condition, and which is also included in an area 1630 located within the preset distance from the outlet location may be displayed as the recommended AP location 1640. In this case, the value of the preset distance may be adjusted according to the user input.

Accordingly, the location at which the AP device, which requires power connection through the outlet, may actually be installed may be provided as the recommended AP location.

FIG. 18 is a flowchart illustrating a control method of a robot cleaner according to an embodiment.

Referring to FIG. 18, the control method of the robot cleaner for recommending the installation location of the AP device according to an embodiment may include storing the map of the space in which the robot cleaner is located (Operation S1810), operating in AP mode outputting the wireless signal corresponding to the output value of the AP device (Operation S1820), sequentially moving to the plurality of measurement locations to measure wireless signal output through the AP mode of the communication interface and connection strength between the plurality of electronic devices disposed in the space (Operation S1830), based on receiving signal strength information on the wireless signal from the plurality of electronic devices at the plurality of measurement locations, storing the received signal strength information by the respective measurement locations (Operation S1840), determining the measurement location at which the signal strength received from the plurality of electronic devices is a threshold value or more as recommended AP location of the AP device (Operation S1850), and providing signal strength information stored by the respective measurement locations and the AP location recommendation UI displaying the recommended AP location on map to user terminal device (Operation S1860).

First, the robot cleaner may be configured to store a map of the space in which the robot cleaner is located (Operation S1810). For example, the robot cleaner may be configured to generate a map of the space by traveling the space in which the robot cleaner is disposed at an initial operation, and store the generated map.

Further, the robot cleaner may be configured to operate in the AP mode outputting the wireless signal corresponding to the output value of the AP device (Operation S1820).

According to an embodiment, the robot cleaner may be configured to move in a direction in which the connection signal strength with the preinstalled AP device increases based on the AP location recommendation instruction being input, and operate in the AP mode when the robot cleaner reaches the preset distance or less from the preinstalled AP device.

In this case, the robot cleaner may be configured to receive the first signal strength information on the wireless signal output through the AP mode and the second signal strength information on the wireless signal output through the preinstalled AP device from the plurality of electronic devices, and adjust the AP mode output value to have a value corresponding to the wireless signal output value of the preinstalled AP device based on the first signal strength information and the second signal strength information.

Accordingly, by adjusting the AP mode output of the robot cleaner to have the wireless network performance similar with the output value of the AP device based on which the user intends to measure the wireless connection quality, the reliability of the AP location recommendation function may be enhanced.

Further, the robot cleaner may be configured to sequentially move to the plurality of measurement locations to measure the wireless signal output through the AP mode of the communication interface and the connection strength between the plurality of electronic devices disposed in the space (Operation S1830).

Here, the robot cleaner may be configured to move along the pre-stored travel route, and receive the signal strength information from the plurality of electronic devices after stopping at the respective locations on the travel route.

Further, the robot cleaner may be configured to store, based on receiving signal strength information on the wireless signal from the plurality of electronic devices at the plurality of measurement locations, the received signal strength information by the respective measurement locations (Operation S1840).

Further, the robot cleaner may be configured to determine the measurement location at which the signal strength received from the plurality of electronic device is a threshold value or more as the recommended AP location of the AP device (Operation S1850).

The robot cleaner may be configured to receive input of the AP location recommendation condition from the user terminal device. In this case, the robot cleaner may be configured to determine the recommended AP location based on the signal strength information received from the plurality of electronic devices and the AP location recommendation condition input through the user terminal device. For example, the robot cleaner may be configured to receive input of the type of AP device to be installed, whether there is a difference in connection quality for the respective electronic devices, whether a location of an outlet has been considered, and the like, as the AP location recommendation condition.

As an example of the AP location recommendation condition, the user may input the type of AP device to the installed. The type of AP device to the installed may be selected from among the first AP device which is the same as the preinstalled AP device or the second AP device (e.g., the extender or the relay) for extending the wireless coverage of the preinstalled AP device. The robot cleaner may be configured to determine, based on the type of AP device to be installed being input as the second AP device, the recommended AP location from among the measurement locations at which the connection signal strength with the preinstalled AP device is a preset value or more.

The robot cleaner may be configured to check the location of the outlet in the space based on the image captured through the camera. Specifically, the robot cleaner may be configured to capture a surrounding space while traveling, and check the location of the outlet by identifying the image of the outlet through an image analysis on the captured image. The robot cleaner may be configured to store the verified location of the outlet on the map.

The robot cleaner may be configured to determine the recommended AP location from among the measurement locations located within the preset distance with respect to the location of the outlet. Accordingly, the location at which the AP device, which requires power connection through the outlet, may actually be installed may be provided as the recommended AP location.

A condition by which a location of an outlet is to be considered may be selected by the user when determining the recommended AP location. For example, the user may input the AP location recommendation condition associated with whether the location of the outlet has been considered through the user terminal device and transmit to the robot cleaner.

Further, the robot cleaner may be configured to provide the signal strength information stored by the respective measurement locations and the AP location recommendation UI displaying the recommended AP location on the map to the user terminal device (Operation S1860).

In this case, the robot cleaner may be configured to display and provide the signal strength information stored by the respective locations corresponding to the plurality of measurement locations on the map in the AP location recommendation UI, and the signal strength information displayed in the AP location recommendation UI may include the signal strength information received from the respective electronic devices.

Meanwhile, the robot cleaner may be configured to identify the names of the plurality of electronic devices based the hostname obtained when wirelessly connecting with the plurality of electronic devices through the AP mode, and display and provide the names of the identified electronic devices and the signal strength information corresponding thereto in the AP location recommendation UI. Accordingly, the wireless connection strength on the respective electronic devices may be intuitively provided to the user.

Various embodiments may be implemented or supported by one or more computer programs, which may be formed from computer-readable program code and embodied in a computer-readable medium. Herein, application and program refer to one or more computer programs, software components, instruction sets, procedures, functions, objects, class, instance, and related data, suitable for implementation in computer-readable program code. Computer-readable program code may include various types of computer code including source code, object code, and executable code. Computer-readable medium may refer to read only memory (ROM), RAM, hard disk drive (HDD), compact disc (CD), digital video disc (DVD), magnetic disk, optical disk, programmable logic device (PLD) or various types of memory, which may include various types of media that can be accessed by a computer.

In addition, the device-readable storage medium may be provided in the form of a non-transitory storage medium. The non-transitory storage medium is a tangible device and may exclude wired, wireless, optical, or other communication links that transmit temporary electrical or other signals. On the other hand, this non-transitory storage medium does not distinguish between a case in which data is semi-permanently stored in a storage medium and a case in which data is temporarily stored. For example, the non-transitory storage medium may include a buffer in which data is temporarily stored. Computer-readable media can be any available media that can be accessed by a computer and can include both volatile and nonvolatile media, removable and non-removable media. Computer-readable media includes media in which data can be permanently stored and media in which data can be stored and later overwritten, such as a rewritable optical disk or a removable memory device.

According to an embodiment, the method may be provided as included in a computer program product. Computer program products may be traded between sellers and buyers as commodities. The computer program product is distributed in the form of a machine-readable storage medium (e.g., CD-ROM), or is distributed between two user devices (e.g., smart phones) directly or through online (e.g., downloaded or uploaded) via an application store. In the case of online distribution, at least a portion of the computer program product (e.g., a downloadable app) may be temporarily stored or created in a device-readable storage medium, such as a memory of a manufacturer's server, a server of an application store, or a relay server.

While certain embodiments have been illustrated and described, it will be understood that the certain embodiments are intended to be illustrative, not limiting. It will be understood by those skilled in the art that various changes in form and details may be made therein without departing from the true spirit and full scope of the disclosure, including the appended claims and their equivalents.

What is claimed is:

1. A robot cleaner comprising:
   a driving device;
   a communication interface configured to operate in an access point (AP) mode in which the communication interface outputs a wireless signal corresponding to a wireless signal output value of an AP device;
   a memory configured to store a map of a space in which the robot cleaner travels; and
   a processor configured to:
      control the driving device to sequentially move the robot cleaner to a plurality of measurement locations,
      control the robot cleaner to output the wireless signal output through the AP mode of the communication interface and, with respect to the wireless signal, obtain signal strength information related to a connection strength between the robot cleaner and a plurality of electronic devices disposed in the space, respectively, at the plurality of measurement locations;
      store the signal strength information in the memory in correspondence to the plurality of measurement locations; and
      based on the stored signal strength information, identify a measurement location at which a signal strength of the plurality of electronic devices is a threshold value or more, as a recommended AP location of the AP device, among the plurality of measurement locations,
   wherein the communication interface is further configured to communicate with a user terminal device, and
   wherein the processor is further configured to control the communication interface to provide, to the user terminal device, the signal strength information that was stored in correspondence to the plurality of measurement locations and an AP location recommendation user interface (UI) configured to display, on the user terminal device, the recommended AP location on the map.

2. The robot cleaner of claim 1, wherein the processor is further configured to control to display, on the user terminal device, the signal strength information by locations corresponding to the plurality of measurement locations on the map in the AP location recommendation UI.

3. The robot cleaner of claim 1, wherein the processor is further configured to:
   identify names of the plurality of electronic devices based on corresponding hostnames obtained when wirelessly connecting with the plurality of electronic devices through the AP mode, and control to display, on the user terminal device, the identified names of the plurality of electronic devices and the signal strength information corresponding thereto in the AP location recommendation UI.

4. The robot cleaner of claim 1, wherein the processor is further configured to receive an input of an AP location recommendation condition from the user terminal device through the communication interface, and identify the recommended AP location based on the signal strength information and further based on the AP location recommendation condition, and wherein the AP location recommendation condition comprises at least one from among a type of AP device to be used, whether there is a difference in connection quality for the plurality of electronic devices, and whether a location of an outlet is to be considered.

5. The robot cleaner of claim 4, wherein the AP location recommendation condition comprises the type of AP device that is a preinstalled AP device or a relay AP device for extending wireless coverage of the preinstalled AP device, wherein the processor is further configured to, based on the type of AP device to be used being input as the relay AP device, identify a recommended AP location from among the plurality of measurement locations at which a connection signal strength between the robot cleaner and the preinstalled AP device is a preset value or more, and wherein the AP device is the preinstalled AP device.

6. The robot cleaner of claim 4, further comprising a camera, wherein the processor is further configured to, based on the AP location recommendation condition being the location of the outlet, check a location of an outlet in the space based on an image captured through the camera, and store the location of the outlet on the map.

7. The robot cleaner of claim 6, wherein the processor is further configured to identify the recommended AP location from among the plurality of measurement locations within a preset distance with respect to the location of the outlet stored on the map.

8. The robot cleaner of claim 1, wherein the processor is further configured to:

control the driving device to move in a direction in which a connection signal strength with the AP device increases based on an AP location recommendation instruction being input, based on the robot cleaner reaching a preset distance or less with respect to the AP device, start operating the communication interface in the AP mode, and control the communication interface to receive first signal strength information with respect to the plurality of electronic devices, respectively, based on the wireless signal output through the AP mode of the communication interface and receive second signal strength information with respect to the plurality of electronic devices, respectively, based on a wireless signal output through the AP device, and adjust an AP mode output value of the communication interface to have a value corresponding to the wireless signal output value of the AP device based on the first signal strength information and the second signal strength information.

9. A control method of a robot cleaner, the control method comprising:

storing a map of a space in which the robot cleaner travels;

operating in an access point (AP) mode of the robot cleaner in which the robot cleaner outputs a wireless signal corresponding to a wireless signal output value of an AP device;

sequentially moving the robot cleaner to a plurality of measurement locations to output the wireless signal through the AP mode and, with respect to the wireless signal, obtain signal strength information related to a connection strength between the robot cleaner and a plurality of electronic devices disposed in the space, respectively, at the plurality of measurement locations;

storing the signal strength information in correspondence to the plurality of measurement locations;

based on the stored signal strength information, identifying a measurement location at which a signal strength of the plurality of electronic devices is a threshold value or more, as a recommended AP location of the AP device, among the plurality of measurement locations; and providing, to a user terminal device, the signal strength information that was stored in correspondence to the plurality of measurement locations and an AP location recommendation user interface (UI) configured to display, on the user terminal device, the recommended AP location on the map.

10. The control method of claim 9, wherein the providing the AP location recommendation UI further comprises controlling to display, on the user terminal device, the signal strength information by locations corresponding to the plurality of measurement locations on the map in the AP location recommendation UI.

11. The control method of claim 9, wherein the providing the AP location recommendation UI further comprises:

identifying names of the plurality of electronic devices based on corresponding hostnames obtained when wirelessly connecting with the plurality of electronic devices through the AP mode, and controlling to display, on the user terminal device, the identified names of the plurality of electronic devices and the signal strength information corresponding thereto in the AP location recommendation UI.

12. The control method of claim 9, further comprising:

receiving an input of an AP location recommendation condition from the user terminal device, wherein the identifying the recommended AP location further comprises identifying the recommended AP location based on the signal strength information and further based on the AP location recommendation condition, and wherein the AP location recommendation condition comprises at least one from among a type of AP device to be used, whether there is a difference in connection quality for the plurality of electronic devices, and whether a location of an outlet is to be considered.

13. The control method of claim 12, wherein the AP location recommendation condition comprises the type of AP device that is a preinstalled AP device or a relay AP device for extending wireless coverage of the preinstalled AP device, wherein the identifying the recommended AP location further comprises identifying, based on the type of AP device being input as the relay AP device, a recommended AP location from among the plurality of measurement locations at which a connection signal strength between the robot cleaner and the preinstalled AP device is a preset value or more, and wherein the AP device is the preinstalled AP device.

14. The control method of claim 12, further comprising:
based on the AP location recommendation condition being the location of the outlet, checking a location of an outlet in the space based on an image captured through a camera; and
storing the location of the outlet on the map.

15. The control method of claim 14, wherein the identifying the recommended AP location further comprises:
identifying the recommended AP location from among the plurality of measurement locations within a preset distance with respect to the location of the outlet stored on the map.

16. A non-transitory computer-readable storage medium storing at least one instruction which, when executed by at least one processor, causes the at least one processor to execute a control method including:
storing a map of a space in which a robot cleaner travels;
operating in an access point (AP) mode of the robot cleaner in which the robot cleaner outputs a wireless signal corresponding to a wireless signal output value of an AP device;
sequentially moving the robot cleaner to a plurality of measurement locations to output the wireless signal through the AP mode and, with respect to the wireless signal, obtain signal strength information related to a connection strength between the robot cleaner and a plurality of electronic devices disposed in the space, respectively, at the plurality of measurement locations;
storing the signal strength information in correspondence to the plurality of measurement locations;
based on the stored signal strength information, identifying a measurement location at which a signal strength of the plurality of electronic devices is a threshold value or more, as a recommended AP location of the AP device, among the plurality of measurement locations; and
providing, to a user terminal device, the signal strength information that was stored in correspondence to the plurality of measurement locations and an AP location recommendation user interface (UI) configured to display, on the user terminal device, the recommended AP location on the map.

17. The non-transitory computer-readable storage medium of claim 16, wherein the operating further includes:
driving the robot cleaner in a direction in which a connection signal strength with the AP device increases based on an AP location recommendation instruction being input;
based on the robot cleaner reaching a preset distance or less with respect to the AP device, starting the AP mode and receiving first signal strength information with respect to the plurality of electronic devices, respectively, based on the wireless signal output through the AP mode and receiving second signal strength information with respect to the plurality of electronic devices, respectively, based on a wireless signal output through the AP device, and
adjusting an AP mode output value of the robot cleaner to have a value corresponding to the wireless signal output value of the AP device based on the first signal strength information and the second signal strength information.

18. The non-transitory computer-readable storage medium of claim 17, wherein the control method further includes:
receiving an input of an AP location recommendation condition from the user terminal device,
wherein the identifying the recommended AP location further includes identifying the recommended AP location based on the signal strength information and further based on the AP location recommendation condition, and
wherein the AP location recommendation condition comprises at least one among a type of AP device to be used, whether there is a difference in connection quality for the plurality of electronic devices, and whether a location of an outlet is to be considered.

19. The non-transitory computer-readable storage medium of claim 18, wherein the AP location recommendation condition comprises the type of AP device that is a preinstalled AP device or a relay AP device for extending wireless coverage of the preinstalled AP device,
wherein the identifying the recommended AP location further includes identifying, based on the type of AP device being input as the relay AP device, a recommended AP location among the plurality of measurement locations at which a connection signal strength between the robot cleaner and the preinstalled AP device is a preset value or more, and
wherein the AP device is the preinstalled AP device.

20. The non-transitory computer-readable storage medium of claim 18, wherein the control method further includes:
based on the AP location recommendation condition being the location of the outlet, checking a location of an outlet in the space based on an image captured through a camera;
storing the location of the outlet on the map; and
identifying the recommended AP location among the plurality of measurement locations within a predetermined distance with respect to the location of the outlet stored on the map.

* * * * *